(12) United States Patent
Le Floch

(10) Patent No.: US 7,228,502 B2
(45) Date of Patent: Jun. 5, 2007

(54) METHOD AND DEVICE FOR TEMPORAL SEGMENTATION OF A VIDEO SEQUENCE

(75) Inventor: Herve Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 10/339,312

(22) Filed: Jan. 10, 2003

(65) Prior Publication Data

US 2003/0132955 A1  Jul. 17, 2003

(30) Foreign Application Priority Data

Jan. 16, 2002  (FR) .................................. 02 00485

(51) Int. Cl.
 *G06F 3/00* (2006.01)
 *H04N 7/18* (2006.01)
(52) U.S. Cl. .................. 715/723; 715/719; 715/765
(58) Field of Classification Search ............... 715/700, 715/719, 723, 764, 765; 348/135, 143, 155; 382/103, 232, 235, 236, 239
See application file for complete search history.

(56) References Cited

U.S. PATENT DOCUMENTS

| 6,195,458 | B1* | 2/2001 | Warnick et al. ............. 382/173 |
| 6,278,446 | B1 | 8/2001 | Liou et al. .................. 345/328 |
| 6,327,390 | B1* | 12/2001 | Sun et al. ................... 382/235 |
| 6,424,370 | B1* | 7/2002 | Courtney .................... 348/143 |
| 6,636,220 | B1* | 10/2003 | Szeliski et al. ............. 345/475 |
| RE38,401 | E * | 1/2004 | Goldberg et al. ........... 715/720 |
| 2001/0040700 | A1* | 11/2001 | Hannuksela et al. ..... 358/261.2 |
| 2002/0013903 | A1 | 1/2002 | Le Floch .................... 713/176 |
| 2002/0120849 | A1* | 8/2002 | McKinley et al. .......... 713/176 |
| 2003/0068067 | A1* | 4/2003 | Fielding et al. ............ 382/100 |
| 2004/0037449 | A1* | 2/2004 | Davis et al. ................ 382/100 |

FOREIGN PATENT DOCUMENTS

| FR | 2 812 502 | 2/2002 |
| GB | 2 361 097 A | 10/2001 |
| WO | WO 01/76253 | 10/2001 |

OTHER PUBLICATIONS

"Digital Video Watermarking", 200/2002, www.AlpVision.com., 6 pages.*
Martin Kutter et al, "Digital Watermarking Technology", 2000, AlpVision, 4 pages.*
J. Oostveen et al., "Visual Hashing of Digital Video: Applications and Techniques"; Proceedings of SPIE, SPIE, Bellingham, Va., USA., No. 4472, Dec. 2001, pp. 121-131.
M.D. Swanson, et al., "Multiresolution Scence-Based Video Watermarking Using Perceptual Models"; IEEE Journal on Selected Area In Communications, IEEE Inc. N.Y. USA., vol. 16. No. 4, May 1, 1998, pp. 540-550.

(Continued)

*Primary Examiner*—Lucila X. Bautista
(74) *Attorney, Agent, or Firm*—Fitzpatrick, Cella, Harper & Scinto

(57) ABSTRACT

According to this method of temporal segmentation of a video sequence (200) containing one or more markers, the analysis of the content of these markers makes it possible to segment the video sequence into a plurality of video subsequences.

32 Claims, 17 Drawing Sheets

OTHER PUBLICATIONS

B. G. Mobasseri, "Direct Sequence Watermarking of Digital Video Using M-Frames"; Image Processings., 1998 Int'l. Conference on Chicago, IL., USA, Oct. 1998, Los Alamitos, Ca., USA, IEEE Comput. Soc., US., Oct. 4, 1998.

Frank Hartung et al., "Watermarking of Uncompressed and Compressed Video", Signal Processing, vol. 66, No. 3, May 1998, pp. 283-301.

* cited by examiner

METHOD AND DEVICE FOR TEMPORAL SEGMENTATION OF A VIDEO SEQUENCE

The present invention relates to a method and device for temporal segmentation of a video sequence.

More particularly, the invention concerns a system enabling a video sequence to be separated into groups of pictures based on the presence or not of a picture marker, also called a watermark, and according to the binary content of the messages associated with these possible watermarks.

FIG. 1 shows the general context of the invention. Three video sequences 100, 101 and 102 are available. The first video sequence 100 is watermarked with a message 103 designated by "message1" in FIG. 1. The third video sequence 102 is watermarked with a message 104 designated by "message3". The second video remains non-watermarked.

The messages are, for example, characteristics of the video (place of filming, identity of the creator, date of creation, etc.). Each of these videos may then possibly be manipulated (step 105). For example, a sub-part of the initial sequence may be extracted and the videos may undergo compression. Each of these modified videos may then be assembled (step 106). Operations 105 and 106 are conventional video editing operations.

The video is next stored and/or transmitted (step 107). Changes of video format may possibly be carried out.

The person receiving the video may extract the different watermarks from the video and separate the video into temporal segments corresponding to the same message (step 108). The temporal segments not having any message are classified as not watermarked. In the example of FIG. 1, the video sequence corresponding to message1 has been extracted (step 109), the non-watermarked part is extracted (step 110) and finally the video sequence corresponding to message3 is extracted (step 111).

By using this technique, it is thus possible to classify a video according to the messages detected and to retrieve the different items of information linked to the initial video sequences.

The present invention consists of the analysis step 108.

The article by F. Hartung and B. Girod entitled "Watermarking of uncompressed and compressed video" published in Signal Processing 66, 1998, pages 283 to 301, describes a method of extracting a watermark in a video sequence watermarked with a single message. The message is inserted by modulation of each of its bits with a pseudo-random sequence and then invisible addition of the modulated sequence to the current picture. Upon extraction, the bits embedded in each picture are demodulated. The demodulation values corresponding to the same bit and coming from different pictures are added to obtain a final message.

However, that method of extraction does not make it possible to deal with the case where several watermarks are inserted in the same video sequence, since a single message is assumed to be embedded in the video.

Document U.S. Pat. No. 6,278,446 provides an algorithm for, firstly, detecting abrupt changes of scene in a video and for, secondly, joining together the scenes having characteristics in common.

It is thus necessary to know the intrinsic properties of the video to be able to perform its temporal segmentation. That algorithm does not make it possible to use a segmentation criterion that is independent from the intrinsic properties of the video.

Document U.S. Pat. No. 6,195,458 provides an algorithm to cut up a video sequence into sub-sequences having characteristics in common. However, these characteristics are linked to the content of the video.

The object of the present invention is to remedy this drawback, by enabling several watermarks to be managed and by providing a segmentation map as a function of the presence and content of the watermarks, and not as a function of the intrinsic properties of the video sequence.

To that end, the present invention provides a method of temporal segmentation of a video sequence containing one or more markers, remarkable in that the analysis of the content of these markers makes it possible to segment the video sequence into a plurality of video sub-sequences.

Thus, video sub-sequences having very different physical content may be assimilated to one and the same sequence if the content of the marker or "watermark" is identical over all these sequences. Correlatively, a video sequence having very uniform physical content may be segmented into several sub-sequences if several watermarks are located therein.

In a particular embodiment, the method according to the invention comprises steps of:
dividing the video sequence into a plurality of groups of pictures;
successively selecting each group of the plurality of groups of pictures;
extracting a binary message from each selected group of pictures;
successively analyzing the validity of each binary message extracted, so as to determine whether that message is a marker or a sequence of natural noise; and
grouping together the groups of pictures according to the content of their message.

According to a particular feature, at the extraction step, a local marker and a global marker are predicted and a first message is extracted from the global marker and a second message is extracted from the local marker.

The local marker makes it possible to achieve good temporal precision for the segmentation. The global marker makes it possible to achieve a good level of robustness to attacks such as compression. Thus, the combined use of local and global markers enables maximum advantage to be taken of the information provided by a global marker with respect to a local marker for the extraction of the messages, while having the possibility of obtaining local messages which serve for obtaining the temporal segmentation.

According to a particular feature, at the extraction step, the size of the message is calculated and the message is then extracted on the basis of that size.

The possibility of using messages of any size gives greater freedom in the choice of the content of the messages, while maximizing robustness to compression.

According to a particular feature, a video synchronization step is furthermore carried out.

This step makes it possible to reduce the risk of error upon detection of the message.

According to a particular feature, at the analysis step, calculation is made of a measure of confidence in the hypothesis that the binary message comes from a group of pictures containing a marker.

This makes it possible to better evaluate whether the watermark extracted corresponds to a message actually inserted in the video sequence.

According to a particular feature, at the analysis step, it is tested whether the message extracted from the current group of pictures is identical to the message extracted from the preceding group of pictures.

This makes it possible to detect whether a change of message has occurred.

According to a particular feature, in order to test whether the message extracted from the current group of pictures is identical to the message extracted from the preceding group of pictures, a calculation is made of the percentage of bits that are different between the message extracted from the current group of pictures and the message extracted from the preceding group of pictures and it is decided that these messages are identical if this percentage is less than a predetermined first value.

Thus, the uncertainty related to a possible compression of the video is taken into account—this compression being liable to degrade the quality of the video.

According to a particular feature, in order to test whether the message extracted from the current group of pictures is identical to the message extracted from the preceding group of pictures, a calculation is made of the percentage of bits that are different between the message extracted from the current group of pictures and the message extracted from the preceding group of pictures and it is decided that these messages are identical if this percentage is smaller than a predetermined first value and if no temporal de-synchronization is noted or if this percentage is greater than a second predetermined value and if temporal de-synchronization is noted.

There is thus taken into account not only the uncertainty related to a possible compression of the video, but also a possible de-synchronization.

According to a particular feature, at the analysis step, the statistic of the errors between a reference message and local messages is studied, and the status and the message of groups of pictures initially detected as not having a marker is modified, if the percentage of errors between the local message considered and the reference message is sufficiently close to the aforementioned statistic, within the meaning of a predetermined criterion.

This makes it possible to learn the statistic of errors between the reference message coming from the last global group of pictures before a change of message and the local messages. This statistic will be used later for possible modification of the preceding local messages which were detected as not being watermarked despite being watermarked with the reference message but which were not detected as so being because the compression was high.

Calculation may for example be made of the average number of erroneous bits between the reference message and the local messages.

The reference message may be calculated from a global group of pictures preceding a local group of pictures for which a change of message has been detected.

In the aforementioned case where the average number of erroneous bits is calculated, the method according to the invention further comprises steps of:
 comparing the average number of erroneous bits with a binary error rate calculated beforehand, and
 if the average number of erroneous bits is less than the weighted binary error rate by a predetermined value, the status of the corresponding group of pictures is modified so that, if it was considered as not having any marker, it be considered after modification as having a marker.

This enables groups of pictures which had been detected as not watermarked to take their true status, i.e. watermarked.

According to a particular feature, at the analysis step, the statuses and the messages linked to local groups of pictures are improved by a feedback loop.

According to a particular feature, each group of pictures is constituted by 24 consecutive pictures.

This value enables a good compromise to be achieved between the precision of the temporal segmentation and the speed of calculation.

With the same object as that indicated above, the present invention also provides a device for temporal segmentation of a video sequence containing one or more markers, remarkable in that it comprises a module for analyzing the content of the markers making it possible to segment the video sequence into a plurality of video sub-sequences.

The present invention also relates to a digital signal processing apparatus, comprising means adapted to implement a method of temporal segmentation as above.

The present invention also relates to a digital signal processing apparatus, comprising a temporal segmentation device as above.

The invention also relates to:
 an information storage means which can be read by a computer or a microprocessor storing instructions of a computer program, making it possible to implement a method of temporal segmentation as above, and
 an information storage means which is removable, partially or totally, which can be read by a computer or a microprocessor storing instructions of a computer program, making it possible to implement a method of temporal segmentation as above.

The invention also relates to a computer program product containing sequences of instructions for implementing a method of temporal segmentation as above.

As the particular features and advantages of the device for temporal segmentation, of the different digital signal processing apparatus, of the different storage means and of the computer program product are similar to those of the method of temporal segmentation according to the invention, they are not repeated here.

Other aspects and advantages of the invention will emerge from a reading of the following detailed description of a particular embodiment, given by way of non-limiting example. The description refers to the accompanying drawings, in which.

Figure 1:
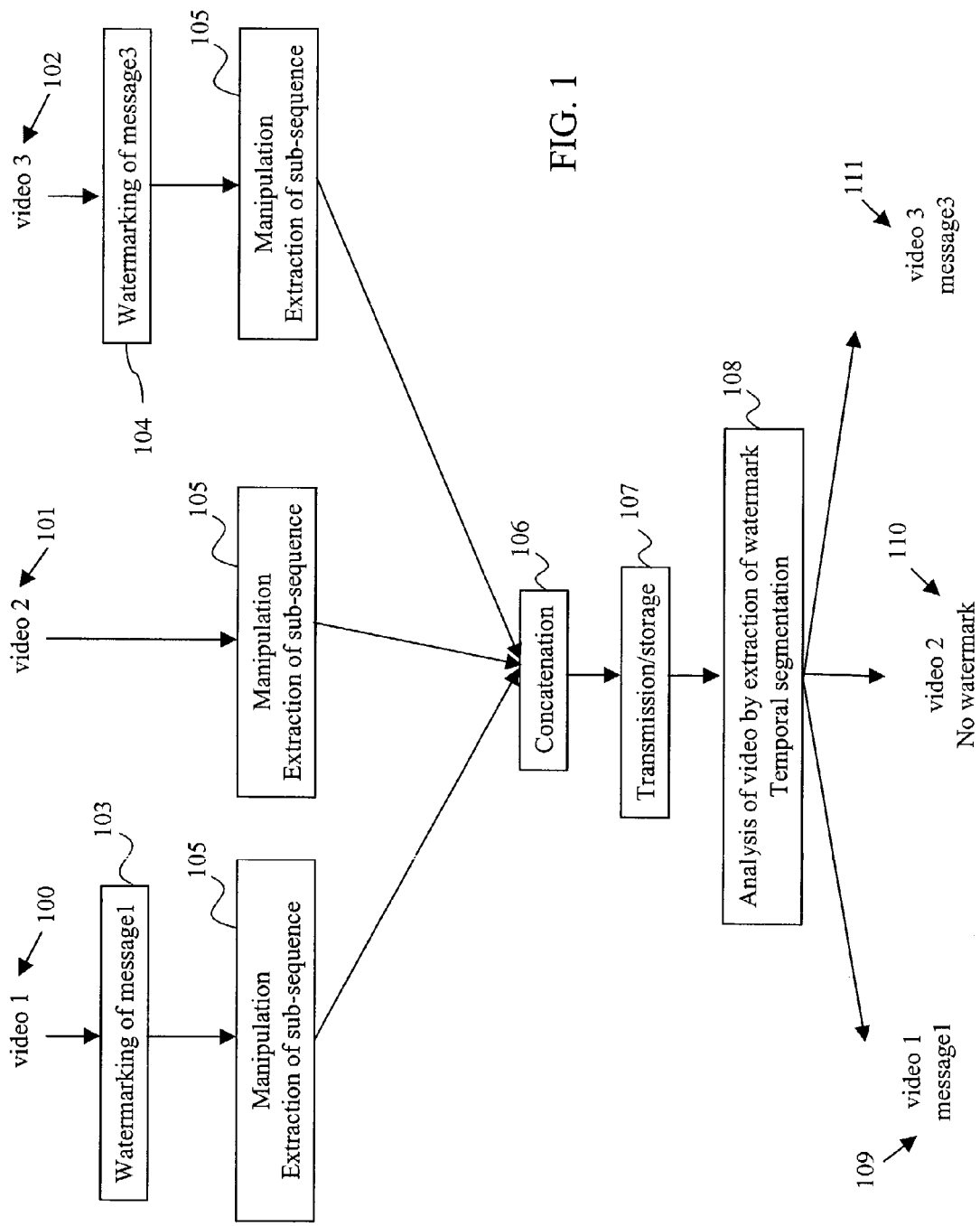
FIG. 1 is a diagram of the general context of the invention.
Figure 2:
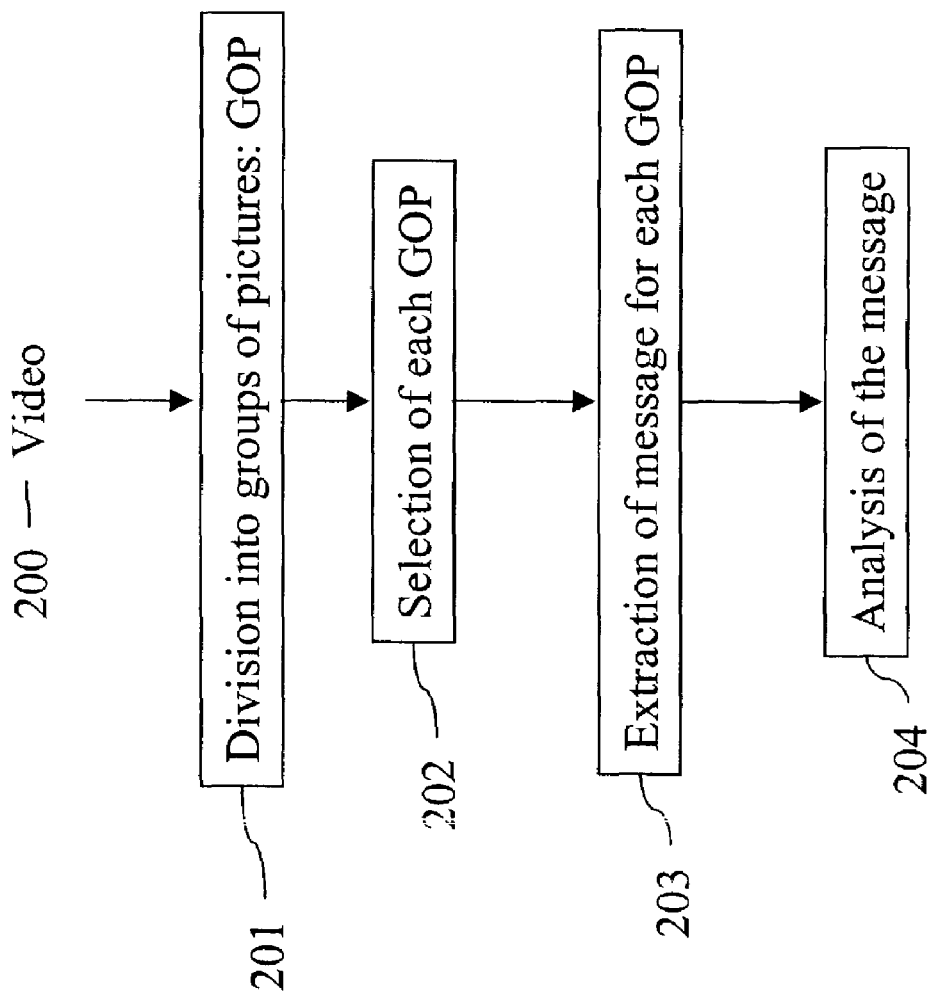
FIG. 2 is a flow diagram giving a general illustration of the steps of the method of temporal segmentation according to the present invention, in a particular embodiment.
Figure 4:
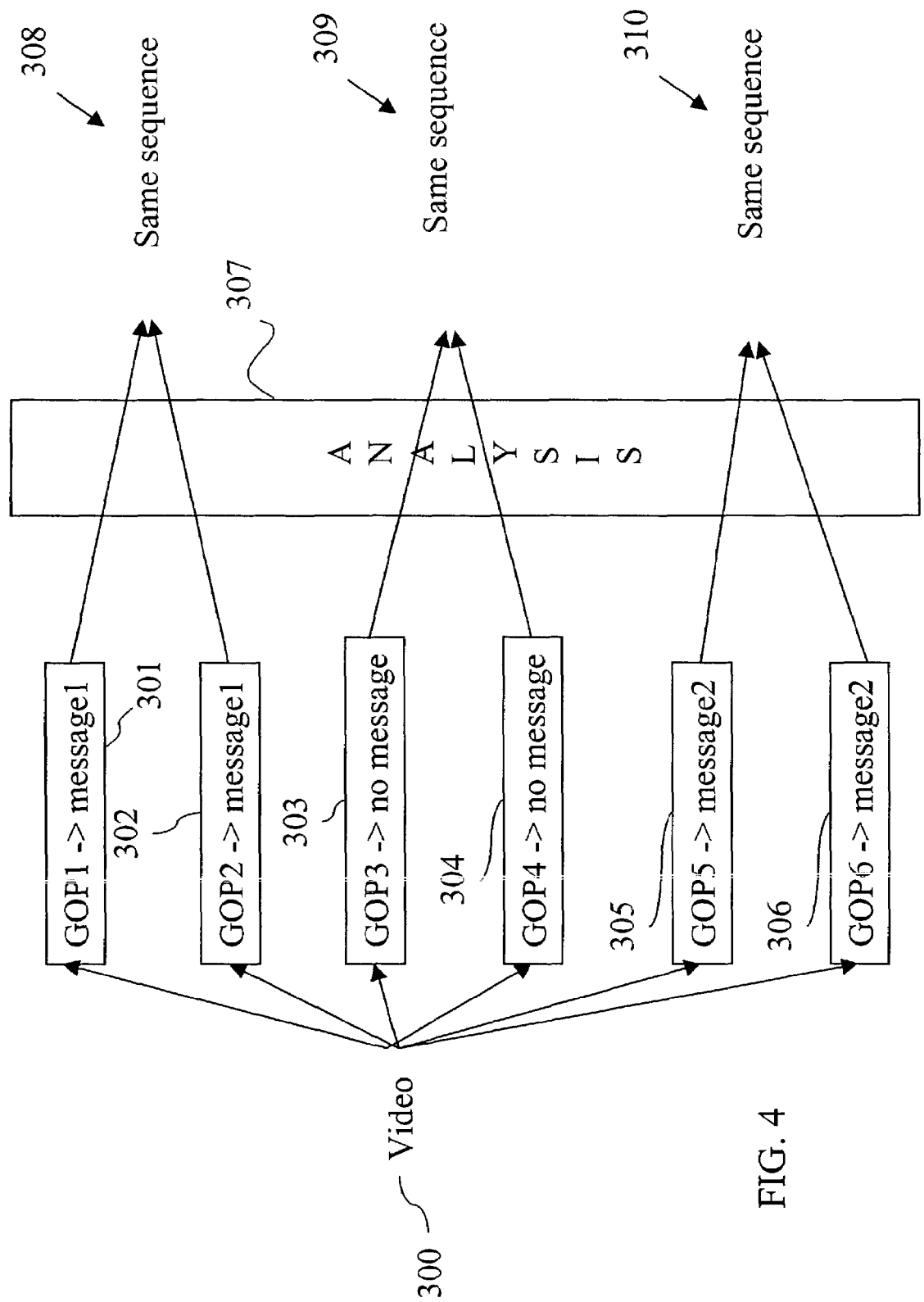
FIG. 4 shows the set of binary messages obtained after completion of the analysis of a video sequence according to the method of temporal segmentation illustrated in FIG. 2.
Figure 5:
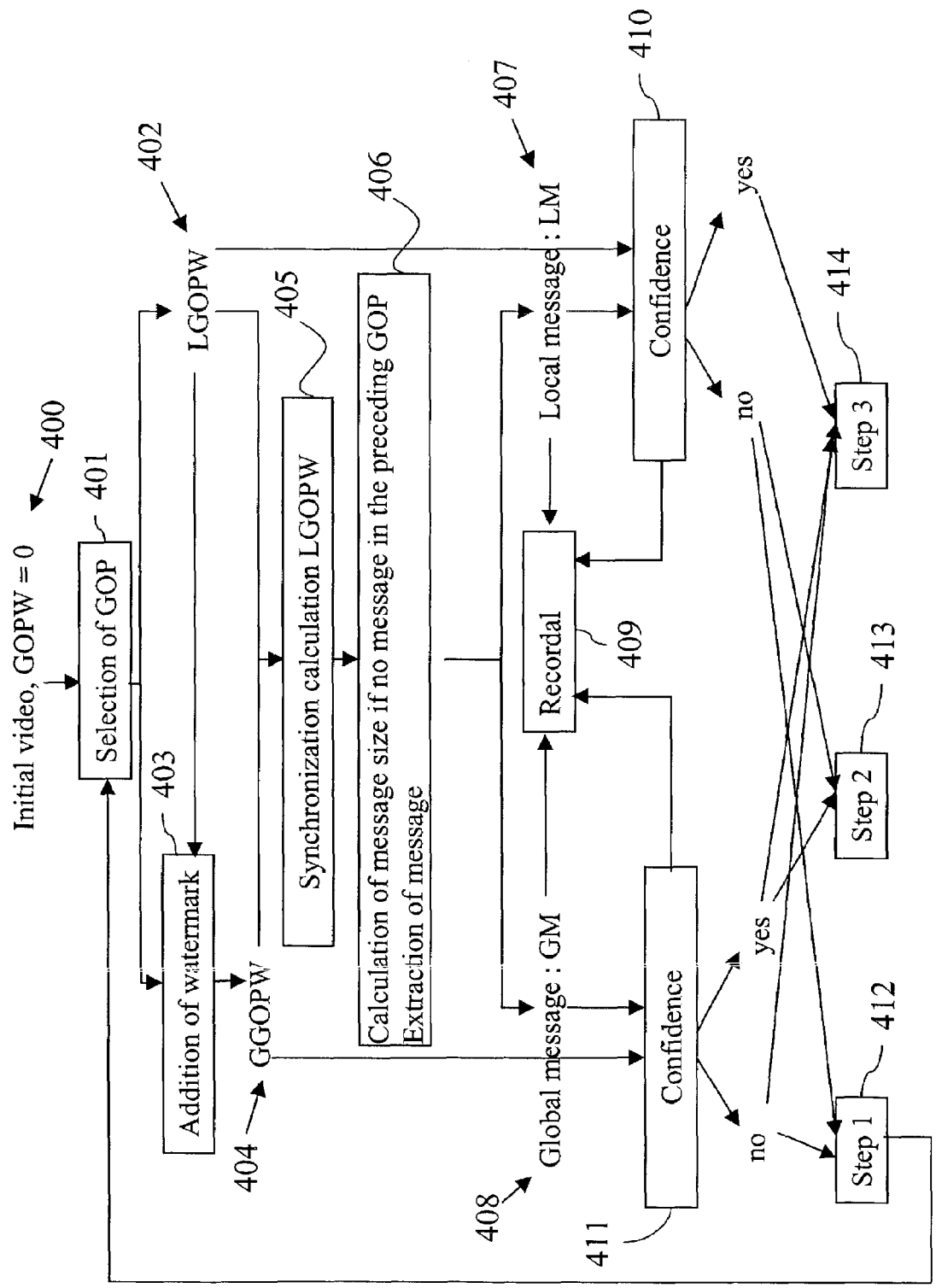
Figure 6:
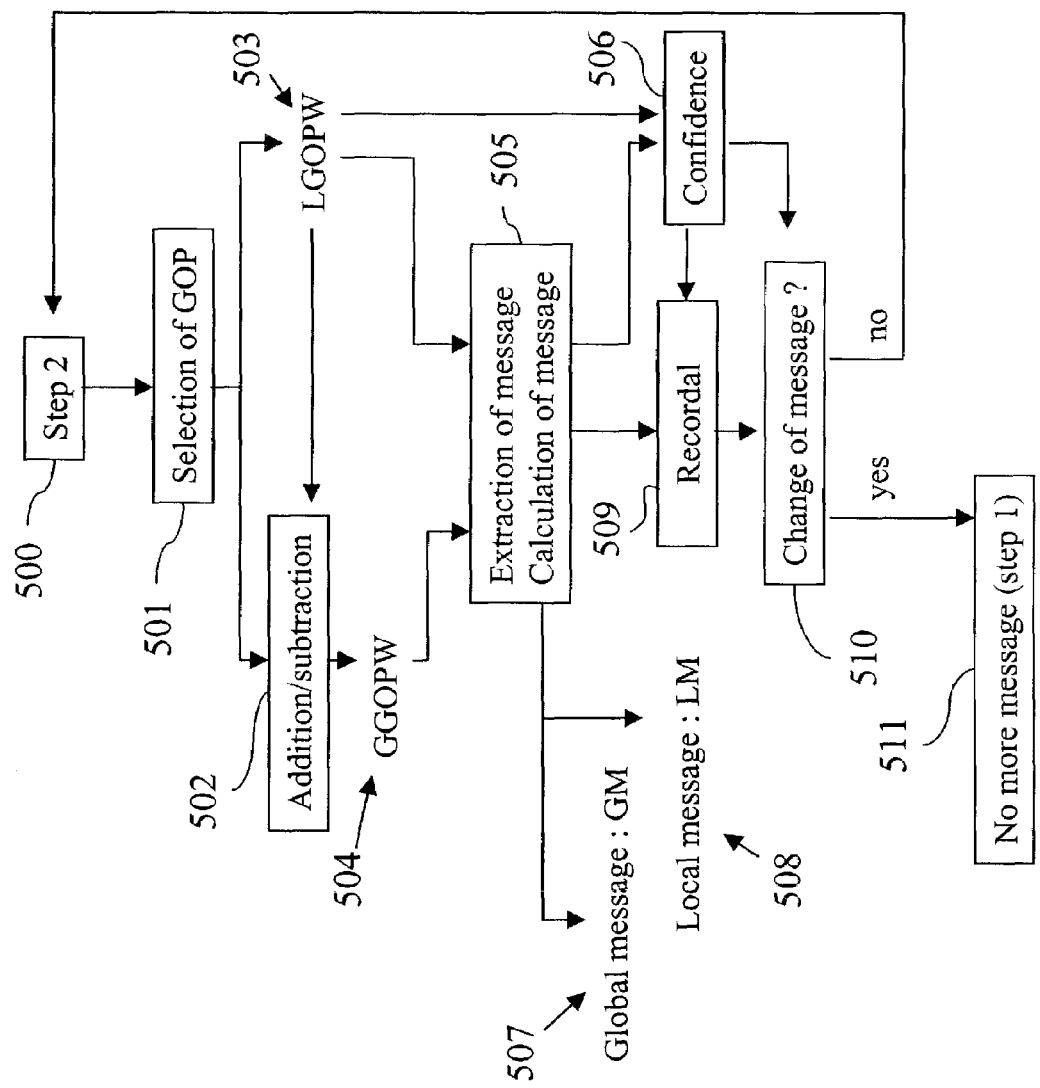
Figure 7:
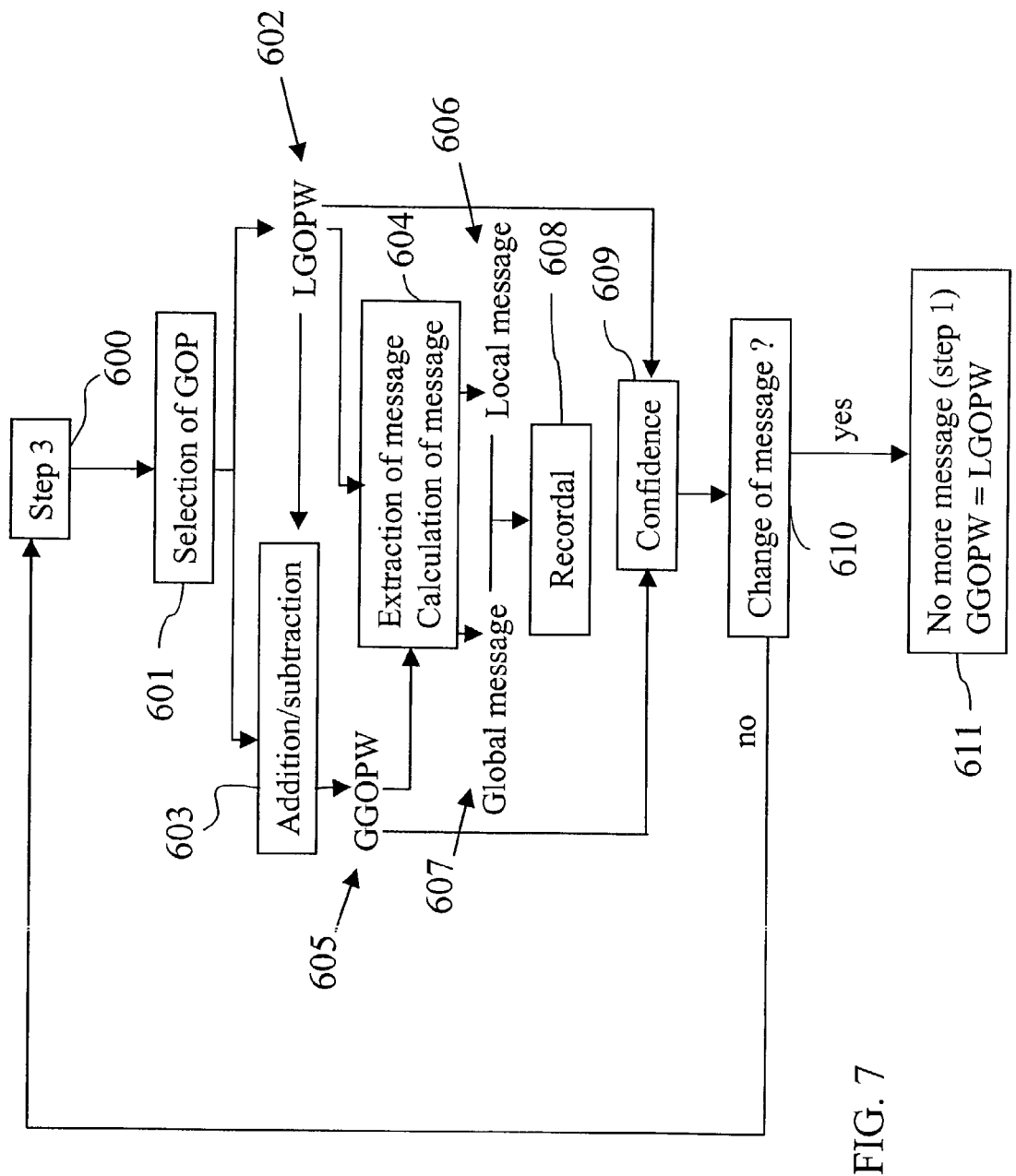
Figure 8:
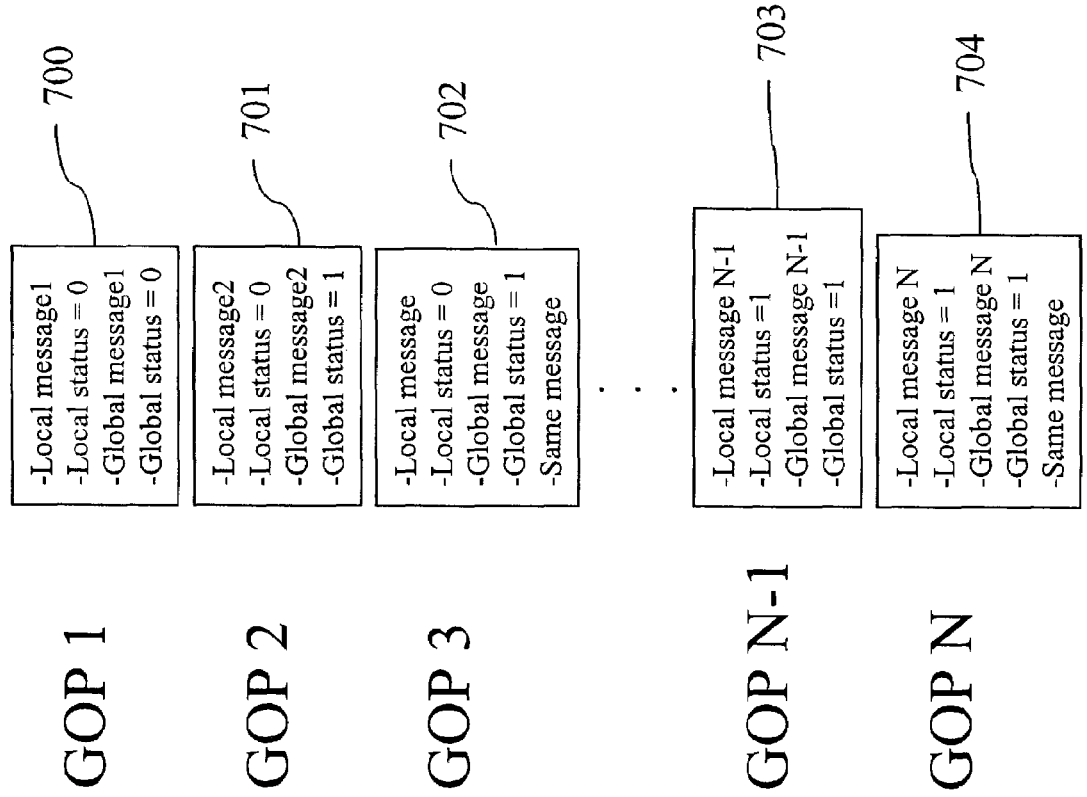
Figure 9:
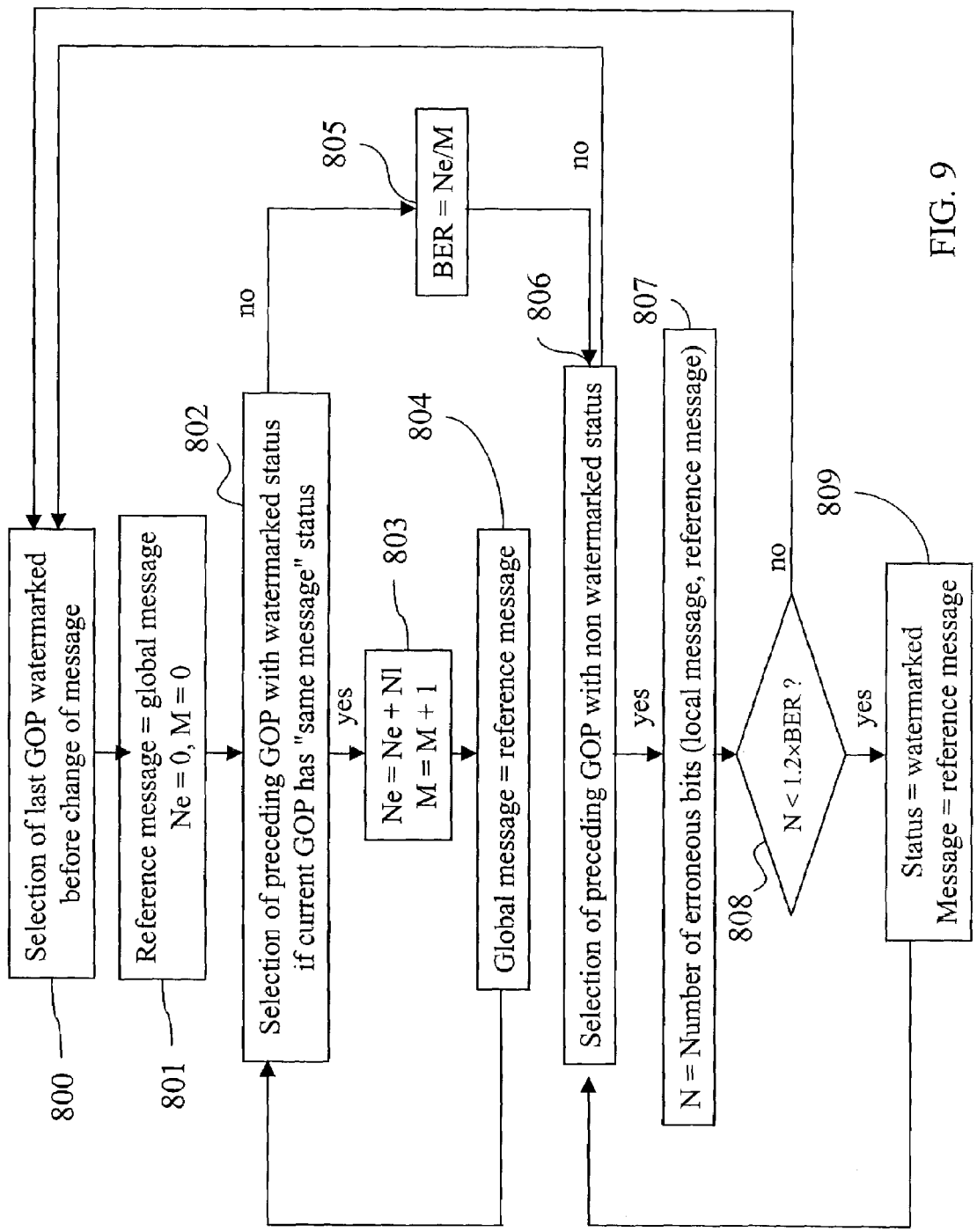
Figure 10:
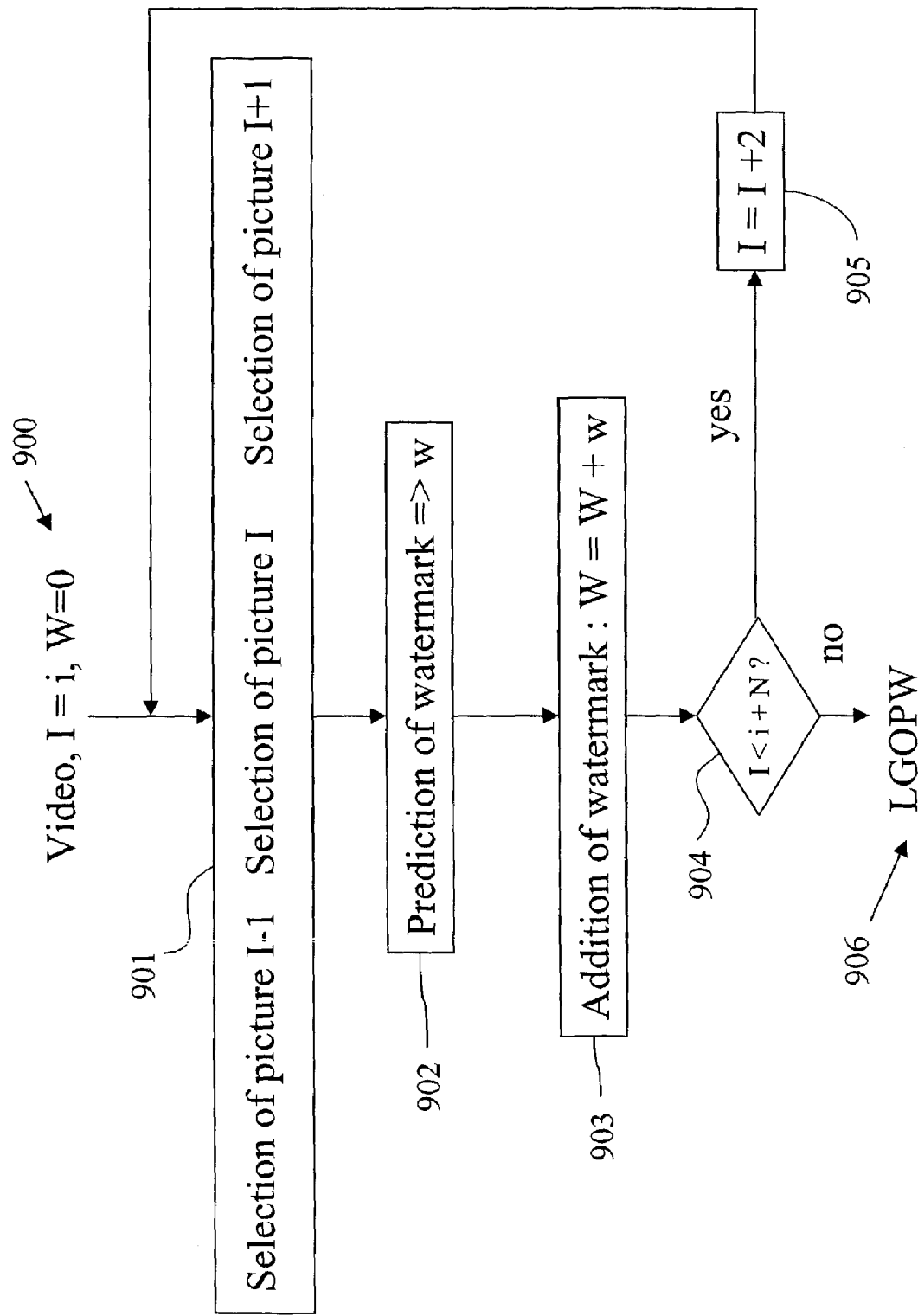
Figure 11:
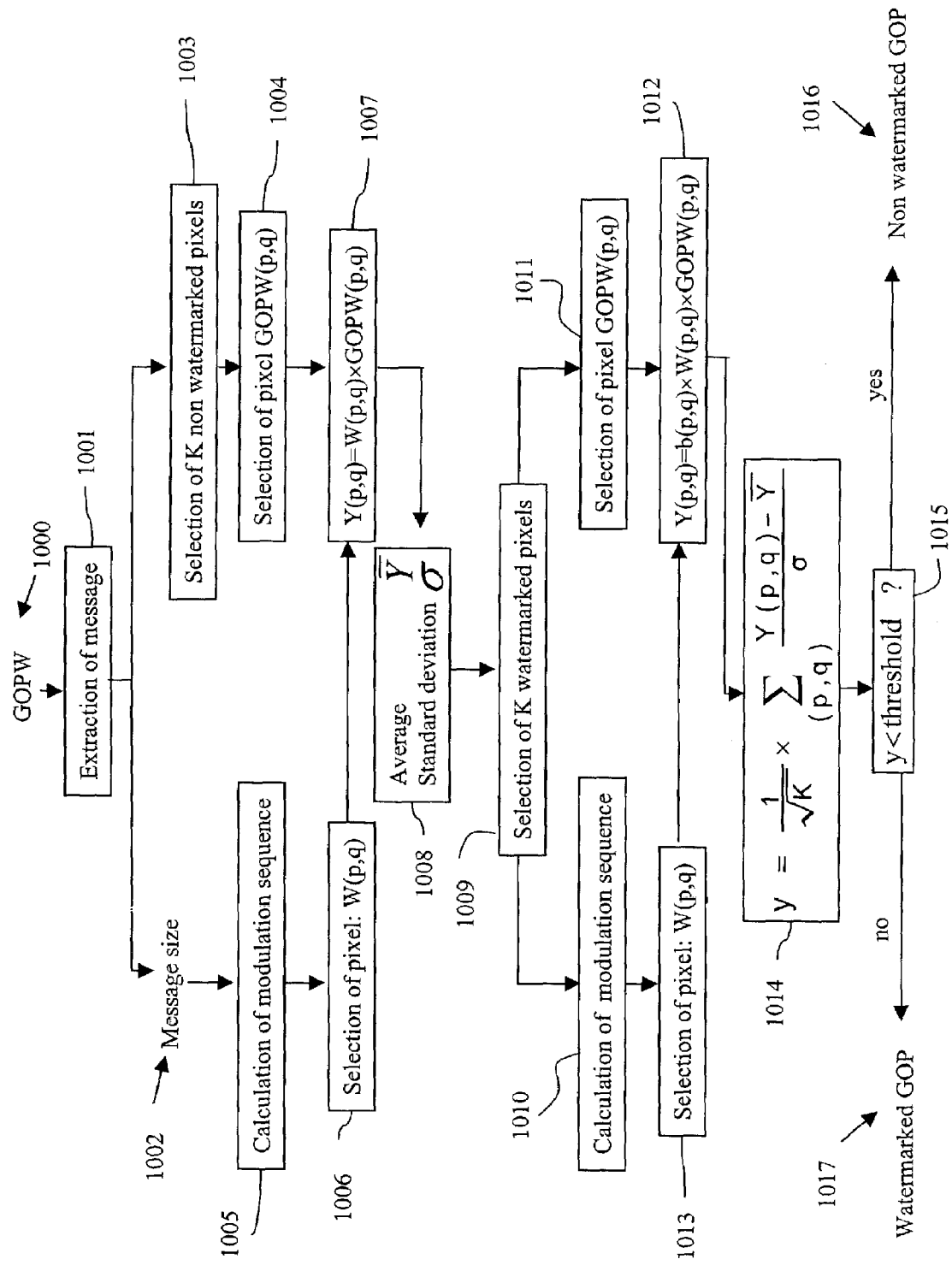
Figure 12:
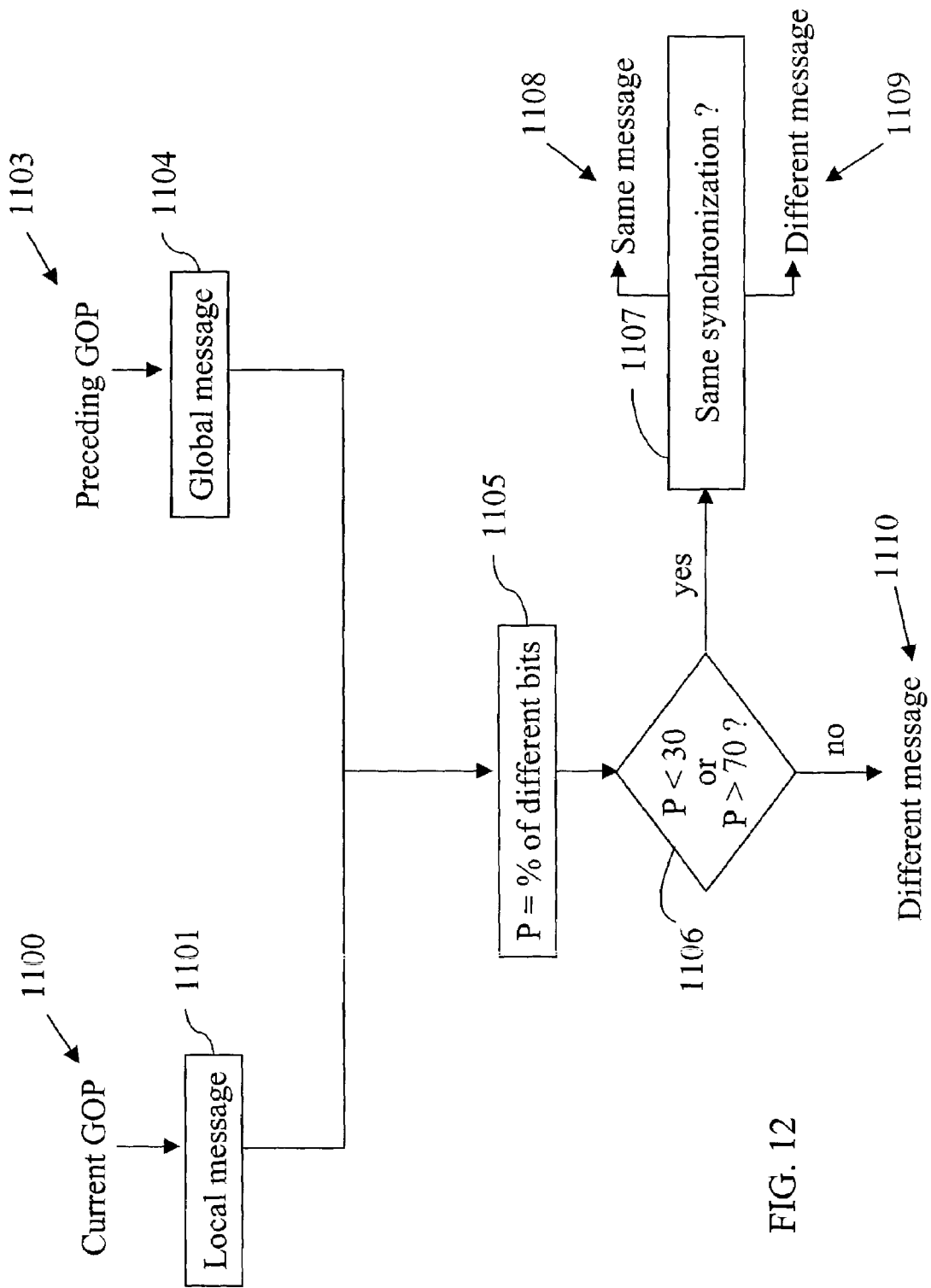
Figure 13:
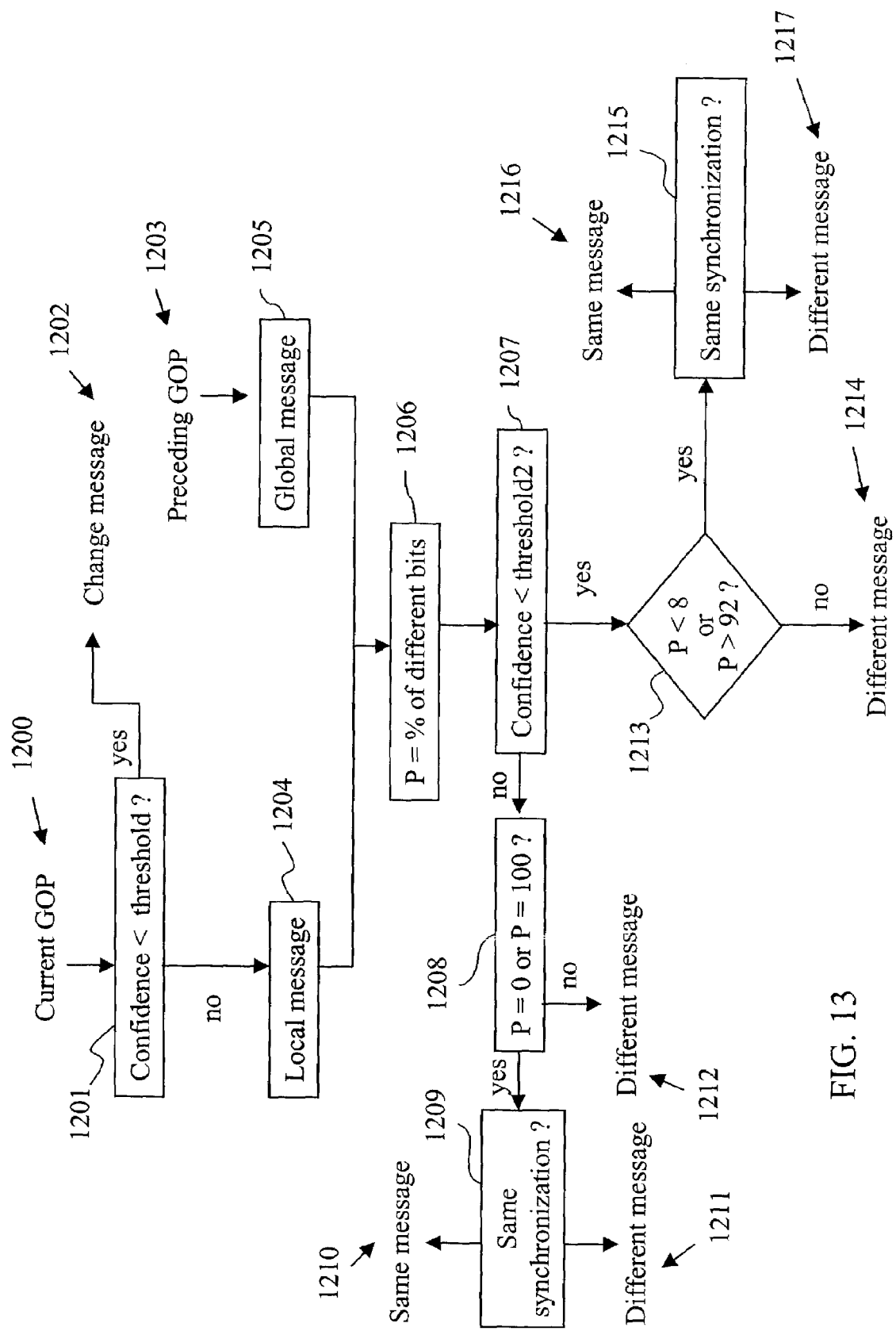
Figure 14:
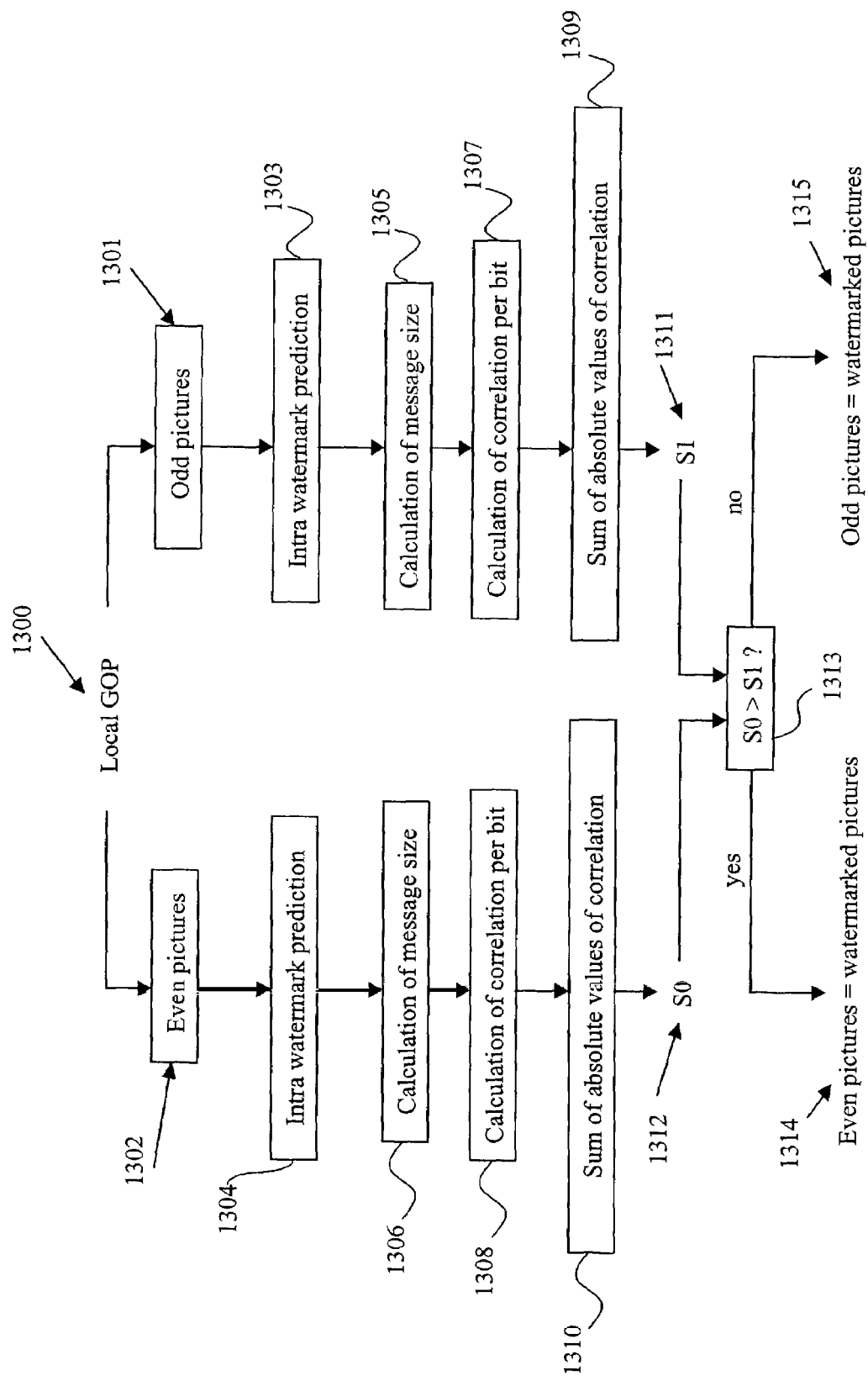

FIGS. 5, 5a, 5b, 6 and 7 each represent in more detail a part of the succession of steps generally illustrated in FIGS. 2 and 4;

FIG. 8 shows an example of a result obtained by application of the succession of steps shown in FIGS. 5 to 7;

FIG. 9 is a flow diagram schematically illustrating a second phase of analysis of the video sequence, performed on the results obtained at the issue of the first analysis according to the present invention, in a particular embodiment;

FIG. 10 shows in more detail step 402 of FIG. 5, of creating a picture marker or watermark;

FIG. 11 shows in more detail steps 410, 411, 506 and 609 shown in FIGS. 5, 6 and 7;

FIG. 12 shows step 510 of FIG. 6 in more detail;

FIG. 13 shows step 610 of FIG. 7 in more detail;

FIG. 14 shows step 405 of FIG. 5 in more detail; and

Figure 15:
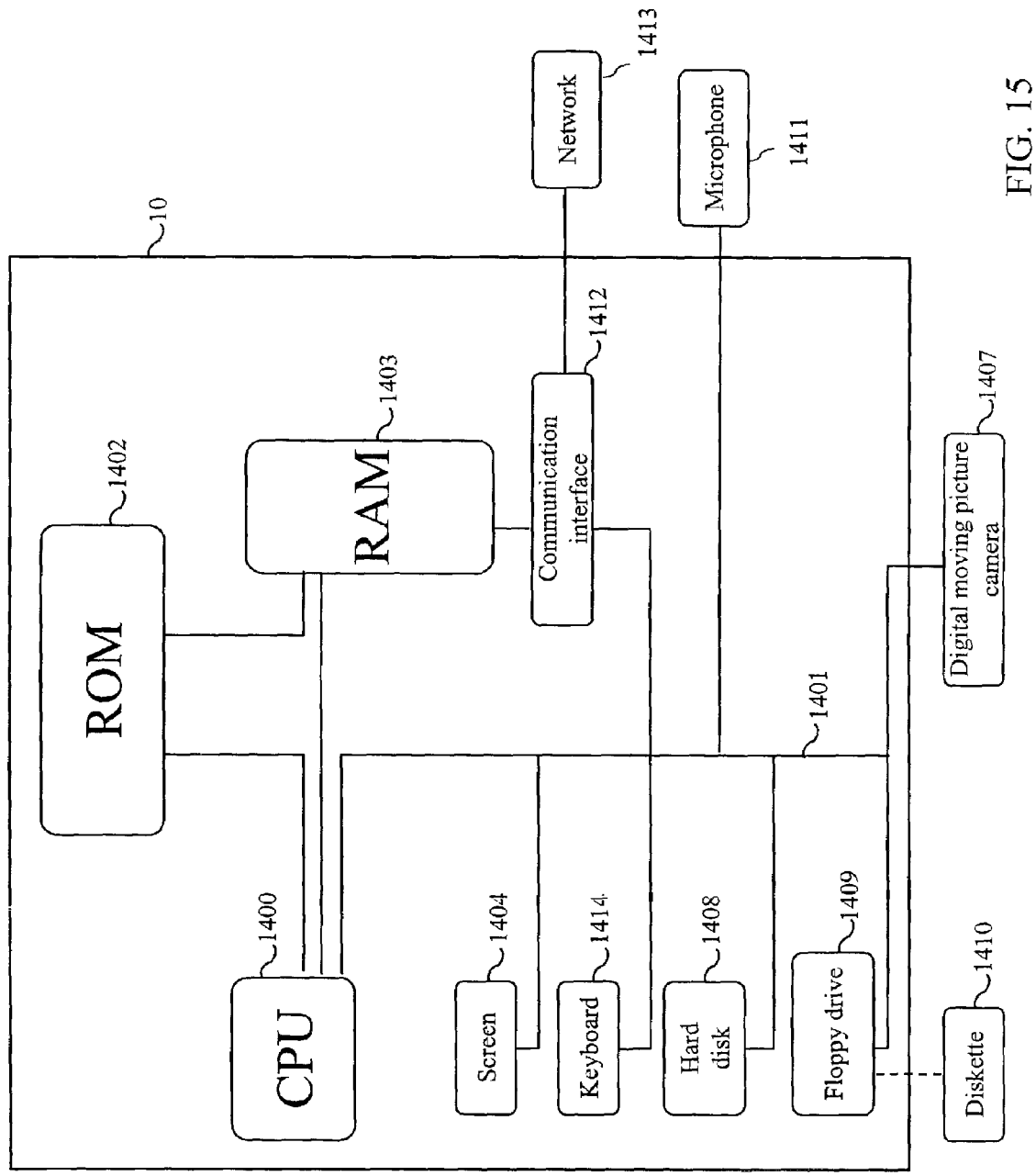

FIG. 15 is a diagram of a device adapted to implement the present invention, in a particular embodiment.

FIG. 2 shows the general outline of the temporal segmentation method provided by the present invention.

A video 200 to be analyzed is considered. This video may possibly not contain any watermark and may contain subsequences with or without watermark. It is in non-compressed format. If the video to be analyzed is compressed, it is therefore necessary to decompress it before performing the analysis. In the case where the video 200 contains several watermarks, these may differ from each other.

It is assumed that binary messages have been embedded in the form of watermarks based on a watermarking algorithm such as that described in the French patent application of filing number 00 09727. By virtue of reminder, FIG. 3 reproduces this algorithm.

A first step St1 of this algorithm is the segmentation of the initial data into regions, for example into adjacent blocks. The number and/or size of the regions may be predetermined or be adjustable by a user.

The message M to be inserted comprises L symbols, where L is an integer. Each symbol $M_i$, with the integer i varying from 1 to L is associated with at least one region at the following step S2. A given region is associated with a single symbol to be inserted. For the association of the symbols with the regions, the regions are gone through in a predetermined order.

The following step S3 is an initialization to consider the first symbol $M_1$ to be inserted, as well as the first region in which this symbol is to be inserted.

At the following step S4, a variable C1 representing the rank of the current symbol is set to the value 1 and a variable C2 is set to the value 0. The variable C2 represents the number of times the current symbol has already been inserted. The variables C1 and C2 are linked to the length of the message M.

The following step S5 is the generation of a key K as a function of an initial key $K_{init}$ and of variables C1 and C2.

The following step S6 is the generation of a pseudo-random sequence as a function of the key K previously generated.

The following step S7 is the modulation of the symbol $M_i$ by the pseudo-random sequence previously generated, which results in a second pseudo-random sequence.

The following step S8 is a psychovisual weighting of the second pseudo-random sequence to ensure its invisibility in the picture.

The pseudo-random sequence so modified is then added to the current region at the following step S9.

The following step S10 is a test to determine whether the current region is the last for the current symbol. If the response is negative, this means that at least one region remains in which the current symbol must be inserted. Step S10 is then followed by step S11. At step S11 the next region is considered in which the symbol $M_i$ is to be inserted, and the variable C2 is incremented by one unit.

Step S11 is followed by the previously described step S5.

When the response is positive at step S10, this means that the current symbol has been inserted in all the regions which are associated with it.

Step S10 is then followed by step S12 which is a test to determine whether the current symbol is the last symbol to insert. If the response is negative, this means that at least one symbol remains to be inserted, and this step is followed by step S13 at which the parameter i is incremented by one unit to consider the following symbol $M_{i+1}$ and the first region associated with it.

Step S13 is followed by the previously described step S4.

When the response is positive at step S12, this means that all the symbols have been inserted in the picture.

It is assumed that each picture of even index contains the entirety of the message in the form of the watermark. All the pictures of even index of the same initial sequence thus bear the same watermark (exception made of the psychovisual weighting factor). The pictures of odd index remain non-watermarked. To achieve this result, it is sufficient, during the course of the watermarking algorithm which has just been described, to test whether the index of the current picture is even before inserting a symbol into it.

As shown in FIG. 2, during a step 201, the video sequence is cut up into groups of pictures or GOP's. A GOP may for example be made up of 24 consecutive pictures. The choice of the size of the GOP's results from a compromise between precision of the segmentation and calculation time. Indeed, by simultaneously analyzing 24 pictures, calculation time is saved with respect to a picture by picture analysis. On the other hand, several watermarks cannot be detected since it is assumed that a single message will be detected in a GOP. Taking 24 pictures per GOP thus makes it possible to achieve a considerable saving in calculation time, while maintaining acceptable precision for the segmentation (24 pictures is approximately equivalent to 1 second).

During a step 202, each GOP is successively selected and, during a step 203, a binary message is extracted for each GOP.

During the following step 204, the validity of the binary message is next analyzed to detect whether the binary message corresponds to a message embedded in watermark form or whether this message corresponds to a sequence of natural noise, which would mean that no message is inserted in the current GOP.

When the whole of the video sequence has been analyzed, a set of binary messages is available as output each corresponding to a group of pictures of the video, as shown in FIG. 4.

In the example of FIG. 4, the video 300 had been cut into six GOP's 301 to 306 and a message has either been associated or not with each GOP. Thus, the first two GOP's 301 and 302 have the message "message1", the following two GOP's 303 and 304 have no message and the last two GOP's 305 and 306 have the message "message2". These different messages are analyzed (step 307) and the different GOP's are grouped together if their messages are similar. At the output of this analysis, the first two GOP's have been analyzed as forming part of the same initial video sequence 308, since they have the same message ("message1"). The last two GOP's have been analyzed as forming part of the same initial video sequence 310, since they have the same message ("message2").

Figure 3:
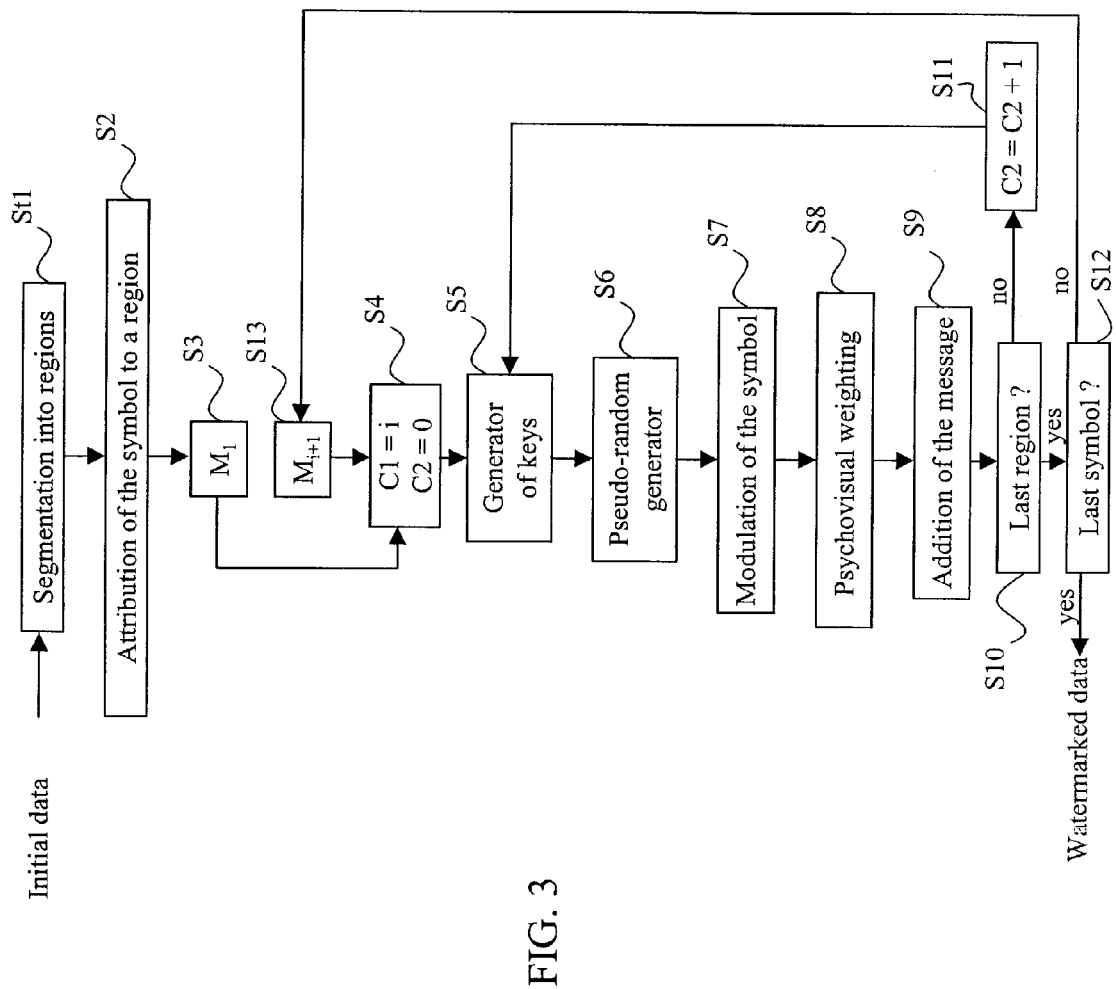
FIG. 3 is a flow diagram showing the main steps of a known algorithm for picture marking or "watermarking"

FIG. 5 shows in more detail a part of the algorithm represented in outline in FIGS. 3 and 4. The rest of the algorithm is represented in FIGS. 6 and 7.

A video sequence 400 is initially available in an uncompressed format. It is assumed that any position in the video is considered. It is also assumed that the video has a non-watermarked status.

A step 401 consists of selecting a GOP from the video 400. The GOP is a set of 24 pictures.

From this GOP, two watermarks 402 and 404 are predicted. The first watermark 402 is called LGOPW since it is calculated from the 24 pictures selected during step 401. The manner in which this watermark is generated is described later with reference to FIG. 10. The second watermark 404 is called GGOPW. This is a global watermark, calculated by adding the local watermark 402 to the global watermark or by subtracting the local watermark 402 from the global watermark: in any pixel (p, q), we have:

GGOPW(p,q)=GGOPW(p,q)+LGOPW(p,q)

or GGOPW(p,q)=GGOPW(p,q)−LGOPW(p,q)

The choice between addition and subtraction is made on the basis of synchronization step 405 and is explained below.

Obviously, when the first GOP of the video sequence is processed, the watermarks GGOPW and LGOPW are the same.

Based on these two predicted watermarks 402 and 404, the following step 405 consists of determining whether the first picture of the current local GOP corresponds to an even picture or an odd picture of the initial video sequence.

More particularly, if this first picture is an even picture then the estimated watermark 402 corresponds, exception made of the prediction errors, to the inserted watermark and the extracted message is the embedded message.

If on the other hand the first picture is an odd picture then the extracted watermark LGOPW corresponds, exception made of the prediction errors, to the opposite of the inserted watermark. In this case, the local watermark LGOPW is changed into its opposite (LGOPW=−LGOPW). After this inversion, the extracted message corresponds to the embedded message.

Once this step has been carried out (the details of this step are described later with the help of FIG. 14), the local watermark 402 is added to the global watermark GGOPW. If the local watermark has been inversed, the addition to the global watermark would correspond to the subtraction of the local watermark initially calculated from the global watermark.

This synchronization step 405 is optional if it is known in advance that the operation of sub-sequence extraction or video editing maintains the parity of the sequence: a sub-sequence begins with an even picture and has an even number of pictures.

Two binary messages are then extracted. A first message 408 is extracted from GGOPW and is designated by the reference sign GM (for Global Message) and a second message 407 is extracted from LGOPW and is designated by the reference sign LM (for Local Message). The extraction method consists in calculating the size of the message, then of extracting the message itself based on the size of the message calculated beforehand.

Figure 5A:
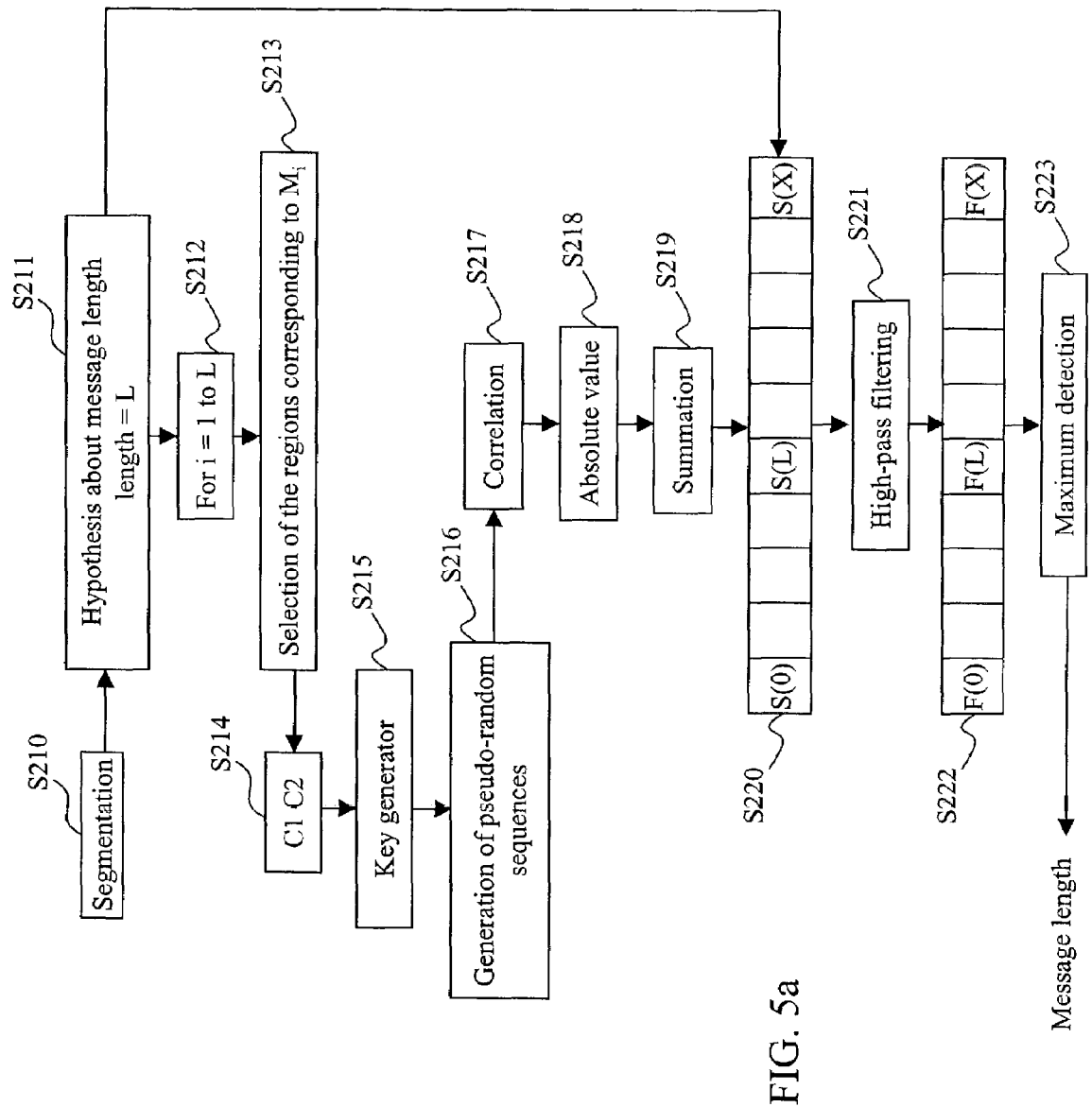
Figure 5B:
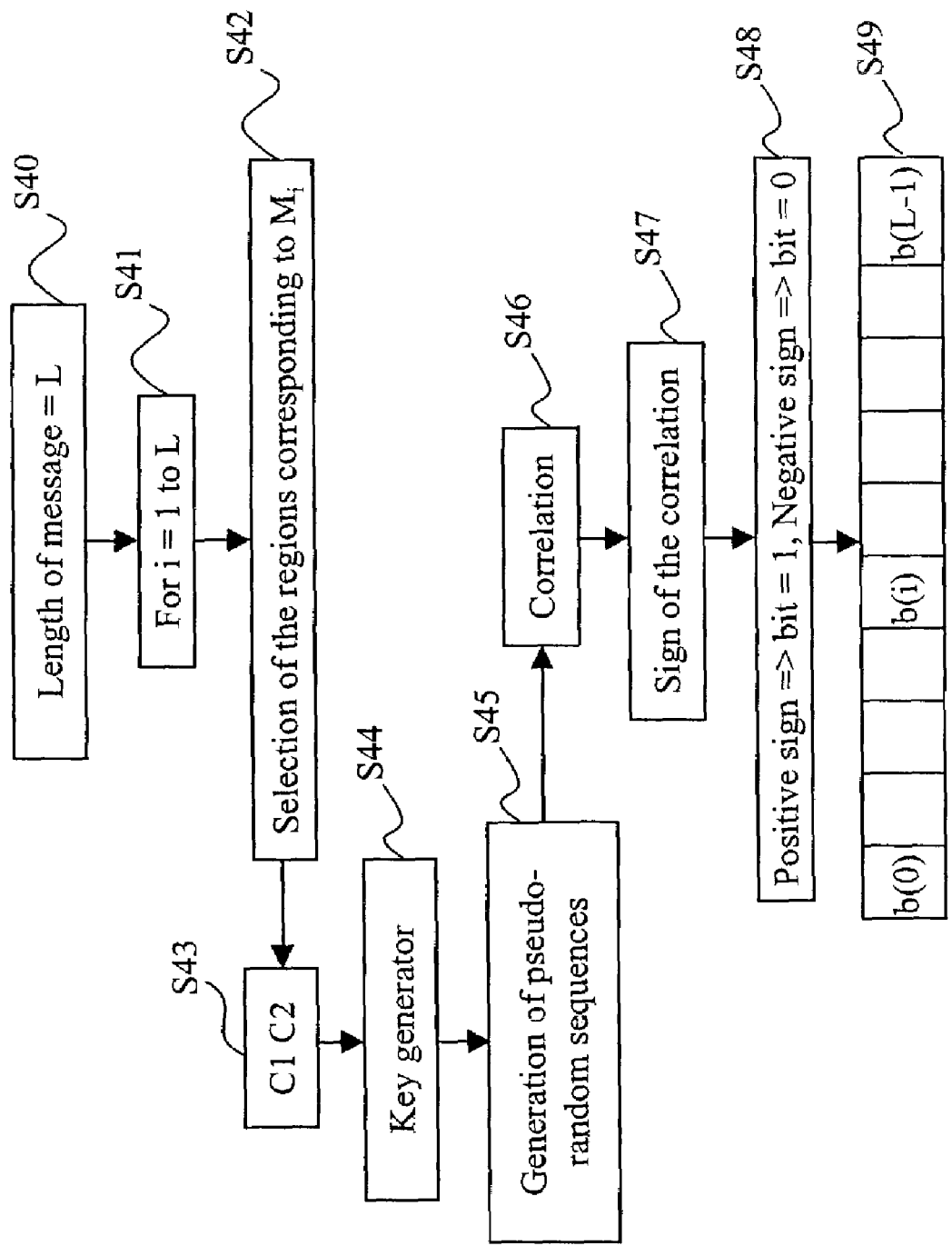

FIGS. 5a and 5b show this extraction method in more detail.

FIG. 5a shows a particular embodiment of the step of detecting the size of the message, in which the inserted message is composed of symbols which are bits.

Step S210 is a segmentation of the data in which the message was inserted beforehand. This step is identical to step S1 of FIG. 3.

The following step S211 is a hypothesis as to the value of the length L of the message which it is sought to extract. The length L may have values between 1 and a maximum value $L_{max}$, which is fixed a priori or which depends on the size of the picture. All these values will be considered successively.

The following step S212 enables a loop to be carried out on all the symbols $M_1$ to $M_L$ of the message. For each loop, a current symbol $M_i$ is considered.

The following step S213 is the selection of the regions corresponding to the current symbol $M_i$. The mechanism of attributing a region to a symbol is identical to that used at step S2 of FIG. 3.

The following step S214 is the determination of the variables C1 and C2 for the current symbol and for each of the regions selected at the preceding step. The variable C1 represents the rank of the current symbol and thus has a unique value for all the regions selected. The variable C2 represents, for each region, the number of times the current symbol has already been inserted.

The following step S215 is a generation of keys, for the current symbol and for each region selected at step S213. The key generation is identical to that of step S5 of FIG. 3, and uses in particular the initial key $K_{init}$.

The following step S216 is the generation of pseudo-random sequences as a function of each of the keys K generated beforehand.

The following step S217 is the calculation of the correlation between the pseudo-random sequences generated at the preceding step and the regions selected at step S213.

The following step S218 consists of calculating the absolute value of the correlation calculated for the current bit and for all the regions which are associated with it.

If the hypothesis (step S211) as to the size of the message is false, the value calculated at step S218 remains low. On the other hand, if the hypothesis as to the size of the message is true, the value calculated at step S218 is high.

The following step S219 is the adding together of the absolute value of the correlation calculated for the current symbol with the absolute values of the previously calculated correlations for the other symbols, for the considered length of the message.

For a given length of message, steps S212 to S219 are repeated for all the symbols of the message.

Steps S211 to S219 are repeated for all the lengths of message to be considered.

Each sum S calculated at step S219 (that is to say for each length of message to be tested) is stored in memory in a table at the following step S220. When all the message lengths have been processed, the table is completely filled and the local maximum is determined among the values of this table.

For this, a high-pass filtering operation is carried out on the table at step S221. For example, the high-pass filtering calculates the separation between the value of the current "cell" of the table and the average of its neighbors. The corresponding high pass filter is the filter (−0.5, 1, −0.5).

The result F of the filtering is written in a second table at step S222.

The following step S223 is the detection of the maximum value contained in the second table. This maximum value corresponds to a length, which is the size of the inserted message. The technique which is used here is the detection of the local maximum, which makes it possible to extract the size of messages of short length efficiently when the range of possible message sizes is very wide, for example from 1 to several thousands of bits.

FIG. 5b shows a particular embodiment of the step of actual message extraction, corresponding to the case in which the symbols of the message are bits.

Step S40 is a reading in memory of the length L of the inserted message. This length has been determined beforehand.

The following step S41 is an initialization of a loop to successively consider all the symbols of the message.

For each symbol, step S42 is a selection of the regions corresponding to the current symbol $M_i$.

The following step S43 is the determination of the values of the variables C1 and C2 respectively for each of the regions selected beforehand. The variables C1 and C2 are determined as explained previously.

The following step S44 is the calculation of the key corresponding to each of the pairs of values (C1, C2).

The following step S45 is the calculation of the pseudo-random sequence corresponding to each of the keys calculated beforehand.

The following step S46 is the calculation, for each pseudo-random sequence calculated beforehand, of the correlation between the pseudo-random sequence and the region which corresponds to it.

The following step S47 is the addition of all the correlation values corresponding to the current symbol. The sign of the sum is then determined.

The following step S48 is a decision about the value of the symbol sought. If the sign determined beforehand is positive, then the symbol is the bit 1, otherwise the symbol is the bit 0.

The value of the bit b is next stored in a table at the following step S49.

At the output of this analysis, at step 409 shown in FIG. 5, the global message and the local message are recorded in a part of the memory dedicated to the current GOP.

It is desirable to use a global GOP when the videos are highly compressed. This is because, in this case, the watermark is generally considerably damaged and the greater the number of pictures used to extract the message, the greater the probability of correctly detecting the inserted message. Thus, often, the message extracted from the local GOP is highly erroneous whereas it has only a few errors or no errors when it is extracted from the global GOP, since the latter contains more pictures and thus a greater amount of information.

Next, the validity of the local message is analyzed at step 410 based on the first watermark LGOPW 402. The output of this analysis gives a measure of confidence in the hypothesis: "the GOP is watermarked". It will be seen later, with reference to FIG. 11, how this variable is calculated. According to the value of this variable, it is decided whether the current local message is a message from a watermarked video or whether it comes from a non-watermarked video.

In the same manner, at step 411 a measure of confidence is calculated which makes it possible to decide whether the global GOP, GGOPW, is watermarked. Based on this analysis, it is decided whether the current global message is a message from a watermarked video or whether it comes from a non-watermarked video.

According to the responses obtained at steps 410 and 411, three different cases may arise:

(i) if none of the GOP's (local or global) is detected as being watermarked (step 1 designated by the reference sign 412) then the algorithm resumes at step 401 with the selection of the following GOP. This case may occur either when the GOP's analyzed are not watermarked, or when the GOP's analyzed are watermarked but are too compressed for the messages to be detected with sufficient confidence. In the latter case, the addition of a new GOP with 24 pictures (that is to say an addition of information) to the predicted watermark GGOPW will perhaps enable the confidence measure to be increased sufficiently in order to decide that the global GOP is watermarked.

(ii) if the global GOP is detected as bearing a watermark but the local GOP is detected as not bearing a watermark, then step 2 (reference 413) is executed. This step is detailed in FIG. 6. This case may arise when the video bears a watermark and when the compression is too high for the measure of confidence of the watermark extracted from the local GOP to be sufficient. The confidence linked to the global GOP is on the other hand better since it bears more information, given that it results from the addition of several local GOP's.

(iii) when the local GOP is detected as bearing a watermark, then step 3 (reference 414) is carried out. This step is detailed in FIG. 7. In this case, the global GOP will also bear the information "watermarked GOP". This last case arises for example when the video has little or no compression. A small amount of information is sufficient to correctly extract a message.

These decisions corresponding to the local and global GOP's are stored in a part of the memory dedicated to the current GOP.

FIG. 6 shows the manner in which the GOP's are processed when the message extracted from the preceding GOP is only valid on the basis of the global GOP (validation by block 411 of FIG. 5). This Figure thus corresponds to step 2 (413) of FIG. 5.

At step 501, a new GOP is selected. At the following step 503 a watermark LGOPW is predicted from that GOP. At the following step 502, that watermark is added to the current global watermark or subtracted from it in order to obtain the global GOP, GGOPW, at step 504. The choice between the addition and the subtraction is made on the basis of a detected change in synchronization. If a change in synchronization is detected, the local watermark is subtracted from the global watermark. If no change in synchronization is detected, the local watermark is added to the global watermark. Further on, in connection with FIGS. 12 and 14, more details about this change in synchronization will be given.

At the following step 505, two messages are extracted from LGOPW and GGOPW. One corresponds to a global GOP (507) and the other to a local GOP (508). At the time of this extraction, the size of the message is not re-calculated: the size of message obtained from the preceding GOP is re-used. In this manner, a saving in calculation time is achieved. At the following step 509, the two messages extracted are stored in the part of the memory dedicated to the current GOP.

Once the two messages have been stored in memory, it is appropriate to define whether they correspond to messages coming from a watermarked video or from a non-watermarked video. For this, a digital value is calculated at the following step 506 from LGOPW obtained at step 503. This digital value is a measure of confidence which corresponds to the probability that the video is not watermarked. Step 506 is similar to steps 410 and 411 of FIG. 5.

This analysis is followed by a test 510 which makes it possible to determine whether the messages extracted from the current GOP are identical to the messages extracted from the preceding GOP. The detail of this analysis is described further on with reference to FIG. 12. Two possibilities may arise:

either a change of message is detected. In this case, the current GOP is again analyzed, according to the schema of FIG. 5. At the start of the new analysis, the GOP is classified as non-watermarked (locally and globally) and the watermark linked to the global watermark (GGOPW) is reset to 0.

or else no change of message is detected. The following step is then step 2.

FIG. 7 describes the manner in which the GOP's are processed when the message extracted from the preceding GOP is valid on the basis of the local GOP (the local GOP has been detected as being watermarked). This Figure thus corresponds to step 3 (414) of FIG. 5.

At step 601, a new GOP is selected. At the following step 602 a watermark LGOPW is predicted from that GOP. At the following step 603, that watermark is added to the current global watermark or subtracted from it in order to obtain the global GOP, GGOPW, 605. The choice between the addition and the subtraction is made on the basis of a detected change in synchronization. If a change in synchronization is detected, the local watermark is subtracted from the global watermark. If no change in synchronization is detected, the local watermark is added to the global watermark. Further on, in connection with FIGS. 13 and 14, more details about this change in synchronization will be given.

At the following step 604, from LGOPW and GGOPW, two messages are extracted: a local message 606 and a global message 607. During this extraction, the size of the message is not re-calculated: the size of message obtained from the preceding GOP is re-used (as for the case in FIG. 6, the absence of a size calculation of the message enables the analysis of the video to be accelerated). At the following step 608, the two messages extracted are stored in the part of the memory dedicated to the current GOP.

Once the two messages have been stored in memory, it is appropriate to define whether they correspond to messages coming from a watermarked video or from a non-watermarked video. For this, a digital value is calculated at the following step 609 from LGOPW obtained at step 602. This digital value is a measure of confidence which corresponds to the probability that the video is not watermarked. Step 609 is similar to steps 410 and 411 of FIG. 5. The same analysis is next carried out, still at step 609, for the global watermark GGOPW 605.

This analysis is followed by a test 610 which makes it possible to determine whether the message extracted from the current GOP is identical to the message extracted from the preceding GOP. The detail of this analysis is described further on with reference to FIG. 13. Two possibilities may arise:

either a change of message has been detected. In this case, the global watermark is reset to zero and the current GOP is again analyzed with a non-watermarked status (611). The following step is thus block 400 of FIG. 5.

or else no change of message is detected. The following step is then step 3 (600).

FIG. 8 shows an example of a result obtained by the algorithm presented in the previous Figures.

When the whole of the video sequence has been analyzed by steps 1, 2 or 3, for each GOP, the following information is available: local message, global message, confidence in the local message (designated by "Local status"), confidence in the global message (designated by "Global status"), change of message with respect to the preceding GOP.

When Local status is equal to 1, this means that the current GOP is detected as being locally watermarked. When Local status is equal to 0, this means that the current GOP is detected as not being locally watermarked. When Global status is equal to 1, this means that the current GOP is detected as being globally watermarked (that is to say that the accumulation of several GOP's is detected as being watermarked). When Global status is equal to 0, this means that the current GOP is detected as not being globally watermarked.

By way of illustration, FIG. 8 gives a few examples of GOP's. The first GOP 700 contains two messages (local and global) and its status is non-watermarked (local watermark and global watermark). The second GOP 701 contains two messages (local and global) and its status is watermarked (status fixed on the basis of the global watermark). The third GOP 702 contains two messages (local and global) and its status is watermarked (status fixed on the basis of the global watermark). It carries in addition the information "Same message" since the analysis made on the basis of the steps shown in FIGS. 5, 6 and 7 has not detected any change of message. The $(N-1)^{th}$ GOP 703 bears the watermarked status like the $N^{th}$ GOP 704.

Experimentally, it has been observed that the result presented here may be erroneous. This is because the first GOP has a non-watermarked status but is followed by GOP's bearing the watermarked status (detected from the global watermark). This may mean that this part of the video is highly compressed and that a large amount of information (several GOP's) is necessary to retrieve the correct message and the status "watermarked". Consequently, it is possible, either that the first GOP is indeed not watermarked, or that the first GOP is watermarked but was not detected as being so since too few pictures were used to extract the message, or that the global message of GOP 2 (701) is false due to the use of too few GOP's, or that the global message of GOP 3 (702) is better than that of GOP 2 since a greater quantity of information had been used.

This is why, in accordance with the present invention, a second phase of analysis, described below with reference to FIG. 9, will make it possible to modify certain messages and certain statuses. This second analysis phase corresponds to step 204 of FIG. 2 or step 307 of FIG. 4.

This second analysis phase of the video is carried out on the results obtained by the first watermark extraction algorithm.

As FIG. 9 shows, it is assumed that initially, at step 800, a GOP is started with having the status "watermarked" and "same message" and such that the following GOP has the status "different message" or the status "non-watermarked".

At the following step 801, a variable called "reference message" is initialized with the global message of the current GOP. Two other variables are initialized. The first variable Ne keeps an account of the number of errors between the reference message and the local messages analyzed during steps 801 to 804. This first variable is equal to the number of bits that are different between the local messages of the current GOP and the reference message (which here is the global message). The second variable M, initialized with the value 0, keeps an account of the number of GOP's analyzed during steps 801 to 804.

The preceding GOP is next selected at the following step 802 if the current GOP has the status "same message" and if the preceding GOP has the status "watermarked". In this case, the number of bits that are different between the reference message and the local message is calculated and is equal to N1. The value N1 is added to the variable Ne at the following step 803 and the variable M is incremented by one unit.

At the following step 804, the global message of this GOP is replaced by the reference message. This operation makes it possible to attribute to this GOP a message from a GOP for which a greater quantity of information was available. The preceding GOP is next selected (return to step 802).

If the preceding GOP bears a "non-watermarked" status, then, at step 805, the variable BER=Ne/M is calculated. This variable represents the average number of erroneous bits between the reference message and the local messages of the GOP's analyzed at steps 802 to 804. Steps 802 to 804 thus make it possible to know on average the number of bits that are different between the reference message and the messages detected from the local GOP's.

As from step 806, the preceding GOP's having a non-watermarked status are selected for analysis. The object of this analysis is to modify their status and their message if the message detected for these GOP's is close to the reference message. To do this, the number of erroneous bits between these local messages and the reference message will be calculated. If the value calculated is close to the BER calculated at step 805 then the status of these GOP's will be modified.

For the current GOP (having a non-watermarked status), if the size of the local message (in number of bits) is the same as the size of the reference message, then the number of bits that are different between the local message and the reference message is calculated. This number is represented by the variable N and is calculated at step 807.

Next, at a test 808, the variable N is compared with the BER calculated previously. If the two values are close, for example if N<1.2×BER, it is deduced that the GOP is actually watermarked (since the local message obeys the same statistic as the local messages of the GOP's which were detected as being watermarked). The message is thus the reference message (step 809) and the status of this GOP is the "watermarked" status. The preceding GOP having a non-watermarked status is next selected (return to step 806). If such a GOP does not exist, then the algorithm ceases to go back and will select, among the GOP's not yet analyzed by this second algorithm, a GOP with "watermarked" status which will be followed by a GOP with the status "change of message" or the status "non-watermarked". The method then resumes at step 800.

The algorithm repeats in this manner until all the GOP's of the video have been processed.

FIG. 10 gives details of the phases of creation of the watermark LGOPW 402 of FIG. 5. This watermark is an estimation of the watermark inserted in each of the pictures of the video.

Step 900 takes initially a video sequence and starts with the picture of this video having index I=i. A watermark parameter W is initialized to 0. A watermark will be extracted from a GOP of N pictures. We have attributed a value of 24 to N. This value represents a good compromise between precision of the analysis and calculation time. It is assumed here that the picture i is a watermarked picture and that this picture is surrounded by two non-watermarked pictures.

At step 901, three pictures are selected. The pictures I+1 and I−1 are used to calculate a prediction Ĩ of the picture I. At the following step 902, the picture Ĩ is subtracted from the picture I (operation I−Ĩ). This subtraction provides a prediction of the watermark w inserted in the picture I. For more detail on that manner of predicting the watermark inserted in the picture, the French patent application of filing number 01 11858 may be referred to.

At step 903, the watermark w is added to the watermark W which had previously been initialized to 0 at step 900. The addition is carried out pixel by pixel: W(p,q)=W(p,q)+w(p,q) where (p,q) is the pair of coordinates of a pixel.

The following step 904 is a test to know if N pictures have been used. If this is not the case, the counter I is incremented by 2 units at step 905 and the process is reiterated from step 901. If N pictures have been used, then the local watermark LGOPW is obtained at step 906.

FIG. 11 gives details of the operations 410, 411, 506 and 609 described previously with reference to FIGS. 5, 6 and 7. These operations consists in determining whether the estimated watermarks, LGOPW or GGOPW (for example, LGOPW 402 in FIG. 5), are watermarks coming from a watermarked video or from a non-watermarked video. To perform this task, an algorithm is used that is known per se, shown in FIG. 11.

It is assumed here that certain parts of the pictures (for example K pixels) of the video sequence remain non-watermarked even if the video is watermarked. This is easy to achieve with the watermarking algorithm described previously with reference to FIG. 3.

At step 1000, a predicted watermark is available. This watermark, called GOPW, may come from a local GOP or a global GOP. At the following step 1001, a message is extracted from this watermark. Consequently, the size of the message 1002 is known and will enable a pseudo-random sequence to be generated.

At step 1003, the K pixels corresponding to the part assumed to be non-watermarked are selected. For each pixel of coordinates (p,q), calculation is made of GOPW(p,q) (step 1004) and W(p,q) (step 1006). W(p,q) is calculated from a modulation sequence generated at the preceding step 1005 from the size of the extracted message.

At step 1007, for each of the pixels selected, the value Y(p,q)=W(p,q)×GOPW(p,q) is calculated. By selecting the K pixels of the non-watermarked part, it is possible to establish, at the following step 1008, the average of the values Y(p,q) and the corresponding variance.

Next, K pixels are selected that correspond to the part of the video assumed to be watermarked (step 1009). For each of these pixels of coordinates (p,q), the value GOPW(p,q) is extracted (step 1011). At step 1012, this value is multiplied, on the one hand, by the corresponding pixel that issued, at step 1013, from the modulation sequence generated at the preceding step 1010 from the size of the extracted message, and, on the other hand, by the value of the bit b(p,q) which had been detected from the blocks bearing the same bit index linked to the pixel (p,q).

The value calculated at step 1012 is thus Y(p,q)=b(p,q)×W(p,q)×GOPW(p,q). From these values, at step 1014, a random variable, denoted y, is calculated:

$$y = \frac{1}{\sqrt{K}} \times \sum_{(p,q)} \frac{Y(p,q) - \overline{Y}}{\sigma}$$

This sum is calculated from the values Y(p,q) from the part assumed to be watermarked.

By virtue of the central limit theorem, it is known that the law of probability of the values y tends towards a Gaussian law centered about 0 with variance 1 if the video is not watermarked. Consequently, it is possible to define a threshold value for which the probability P that the variable y is less than this threshold is equal to a chosen value (for example P(|y|<threshold)=1−10⁻⁴). Thus, at the issue of test 1015, it is decided that the video is non-watermarked if the value of the variable y calculated at step 1014 is less than this threshold (case 1017) and that the video is watermarked if the value of y is greater than the threshold (case 1016).

The value of y is called "measure of confidence", given that the higher this value, the greater the probability of the video being watermarked.

FIG. 12 details the test 510 of FIG. 6. This test makes it possible to decide whether the message detected based on the current GOP is different from the message detected based on the preceding GOP. It should be recalled that FIG.

6 illustrates the case in which the local GOP had been detected as not being watermarked whereas the global GOP had been detected as being watermarked.

From the current GOP 1100, a local message 1101 had been extracted. The percentage P of bits that are different between this local message and the global message 1104 calculated from the preceding GOP 1103 is calculated at step 1105.

A test 1106 is next carried out to determine whether the value of P is less than 30 or greater than 70. If this is the case, the two messages are considered as potentially identical. Knowing that there is assumed to be high compression, it is impossible to precisely detect a change of message.

If the value of P is between 30 and 70, it is considered that the current GOP bears a message different from the preceding GOP (1110).

It should be noted that if the value of P is greater than 70 (for example P=100), it is entirely possible that the message is the same but that an odd temporal de-synchronization had taken place. To be sure of this, a re-synchronization process is applied, as illustrated by FIG. 14 (step 1107). Nevertheless, in this case, steps 1305 and 1306 are not carried out since the size of the message is already known.

If no de-synchronization is found, then the fact that P is greater than 70 signifies that a change of message has taken place (case 1109). If a de-synchronization is found, then the fact that P is greater than 70 does not correspond to a change of message (case 1108).

Similarly, when P<30, it is entirely possible that the message is different but that a temporal de-synchronization had taken place. In this case, a test (1107) can be carried out to determine whether this temporal de-synchronization has taken place. If a de-synchronization is found the message is detected as being different (case 1109). Otherwise, no modification is detected (case 1108).

When a temporal de-synchronization is detected, it affects the rest of the sequence. The pictures which were considered as even are now considered as odd and vice-versa.

When a temporal de-synchronization is detected, the estimated watermark is no longer GOPW but −GOPW. The global watermark GGOPW is then re-constructed, no longer by adding LGOPW to the global watermark, but by subtracting LGOPW from the global watermark. The local message is then no longer LM but −LM (the 0 bits are transformed into 1 and vice-versa).

If it is known in advance that the extraction of the sub-sequences will not permit temporal de-synchronizations, then a value of P greater than 70 is automatically considered as a change of message, and the de-synchronization detection algorithm (1107) is in this case not useful.

FIG. 13 details the test 610 of FIG. 7. This test makes it possible to decide whether a change of message has taken place between the current GOP and the preceding GOP. Initially the data linked to the current GOP 1200 are available (for example LGOPW 602 of FIG. 7).

From these data, the confidence in this watermark is calculated (FIG. 11). This measure of confidence (called y at step 1014 of FIG. 11) is compared with a threshold at step 1201.

If the measure of confidence is less than this threshold, then a change of message 1202 is recorded. This means that the current GOP analyzed is either not watermarked, or watermarked but with too high a compression for the message to be correctly read.

If the measure of confidence is greater than the threshold, then the local message of the current GOP 1204 is compared to the global message 1205 of the preceding GOP 1203: the percentage P of bits that are different between the local message of the current GOP and the global message of the preceding GOP is calculated at step 1206.

The measure of confidence coming from the local watermark (LGOPW) is next compared with a second threshold at step 1207. If this measure of confidence is greater than this threshold, step 1207 is followed by a test 1208 during which the value of P is compared to 0 or to 100.

If P is equal to 0, two cases may arise. Either a temporal de-synchronization has taken place and there is a change of message (case 1211), or there is no temporal de-synchronization and the message is identical to the preceding GOP (case 1210): no change of message is then validated.

Similarly, if P is equal to 100, two cases may arise: either a temporal de-synchronization has taken place (without change of message) (case 1210), or a change of message has taken place (without temporal de-synchronization) (case 1211).

If, on the other hand, the value of P is different from 0 or 100, then a change of message is validated (case 1212).

The supplementary step 1209 making it possible to confirm whether a change in temporal synchronization has taken place may be carried out by applying the algorithm illustrated by FIG. 14 to the local GOP. Nevertheless, in this case, steps 1305 and 1306 are not carried out since the size of the message is known.

For steps 1208 à 1212, no error is permitted since the confidence value is very high, according to the result of step 1207. This means that the watermarked video has a watermark of high reliability. Any change of bit is then assimilated to a change of message.

On the other hand, if, at step 1207, the measure of confidence is less than the threshold, then during a test 1213, the value of P is compared to the values 8 and 92 in order to determine whether P<8 or P>92. If the response to test 1213 is negative then a change of message is validated (case 1214). If, on the other hand the response to the test 1213 is positive, then two cases may arise (step 1215). Either a temporal de-synchronization has taken place and has been detected at step 1215, or no de-synchronization has taken place. If P<8 and if no de-synchronization is detected, then no change of message is validated (case 1216). If P<8 and if a temporal de-synchronization has taken place, then a change of message is validated (case 1217).

Similarly, if P>92 and if no de-synchronization is detected, then a change of message is validated (case 1217). If P>92 and if a temporal de-synchronization has taken place, then no change of message is validated (case 1216).

In the case of a temporal de-synchronization, the estimated local watermark is no longer LGOPW but −LGOPW. The global watermark GGOPW is then re-constructed, no longer by adding LGOPW to the global watermark, but by subtracting LGOPW from the global watermark. The local message is then no longer LM but −LM (the 0 bits are transformed into 1 and vice-versa).

A supplementary step (1209 and 1215 respectively) making it possible to confirm whether a change in temporal synchronization has taken place may be carried out by applying the algorithm illustrated by FIG. 14 to the local GOP. Nevertheless, steps 1305 and 1306 are not carried out since the size of the message is known.

If it is known in advance that no temporal de-synchronization is permitted by the video editors used, then a value of P greater than 92 is directly considered as a change of message.

FIG. 14 illustrates the manner of determining whether the first picture of the local GOP corresponds to an even or odd picture of the original sequence. Based on this information, it may be determined whether the watermark is inserted in the even or odd pictures of the sub-sequence. Thus, it may also be determined whether a change of temporal synchronization has taken place. Indeed, if the first picture of the preceding local GOP was a watermarked picture and if the first picture of the current local GOP is detected as not being watermarked, a change of temporal synchronization is detected.

To carry out this step, the 24 pictures of the local GOP 1300 are separated into two sub-sets: the sub-set of the odd pictures (1301) and the sub-set of the even pictures (1302). Each picture of the sub-set of the odd pictures is next filtered by a high pass filter and produces a prediction of the watermark inserted in the current picture (step 1303). All these predicted watermarks are added together.

From this predicted watermark, the size of the message linked to this watermark is calculated (step 1305). For each bit of this message, the corresponding regions are selected and a calculation of correlation between these regions and the associated modulation sequence is carried out (step 1307). The sum is calculated of the absolute values of these correlations (step 1309), giving rise to the value S1 (1311).

If the watermark is really inserted in the odd pictures, the size of the message calculated at step 1305 corresponds to the size of the embedded message. The modulation sequence calculated from this size makes it possible to obtain correlation measurements between the watermark inserted and the modulation sequence used to insert this watermark. The values of these correlation measurements are thus high.

By contrast, if the watermark is not inserted in the odd pictures (that is to say that there is no message embedded in the odd pictures), the size of the message calculated at step 1305 does not correspond to a real size. Consequently, the correlation measurements carried out at step 1307 correspond to measurements between the non-watermarked pictures and a modulation sequence having no link with these pictures. The correlation will thus be low.

The same processing is also applied to the even pictures. The even pictures (1302) of the local GOP 1300 are selected one by one and a prediction of the watermark inserted is carried out (1304) by high-pass filtering. The result of the prediction is added to the preceding predictions. Once all the even pictures of the GOP have been processed, an approximation of a possible watermark is obtained. The size of the message embedded in this watermark is then calculated (step 1306). From this size, the modulation sequence making it possible to extract each of the bits is calculated and the absolute value of the correlation measurement linked to each bit is calculated. This value is added to the measurements already calculated (step 1310). The final value is the variable S0 (step 1312). If the watermarked pictures are the even pictures, the value of S0 will be high.

A test 1313 is carried out to determine whether S0 is greater than S1. In this case (1314), the even pictures are detected as being pictures having the watermark. In the opposite case (1315), the odd pictures are the watermarked pictures.

In the drawing, the steps 1305 and 1306 correspond to the calculation of the size of the message based on the watermarks estimated by an intra-picture prediction (steps 1303 and 1304). The calculation of the size of the messages based on the local GOP may also be considered as illustrated by FIG. 10. In this manner, the probability that the size of the message is correctly calculated is greater, since the temporal prediction leads to a better quality than the intra-picture prediction. However, the calculation of the correlation per bit at steps 1307 and 1308 must always be made through the intermediary of an intra-picture technique (steps 1303 and 1304).

Similarly, if the size of the message is already known, steps 1305 and 1306 are not necessary.

As shown in FIG. 15, a device implementing the invention is for example a microcomputer 10 connected to different peripherals, for example a digital moving picture camera 1407 (or a scanner, or any other picture acquisition or storage means) connected to a graphics card and supplying information to be processed according to the invention.

The device 10 comprises a communication interface 1412 connected to a network 1413 able to transmit digital data to be processed or conversely to transmit data processed by the device. The device 10 also comprises a storage means 1408 such as a hard disk. It also comprises a drive 1409 for a disk 1410. This disk 1410 may for example be a diskette, a CD-ROM, or a DVD-ROM. The disk 1410, like the disk 1408, may contain data processed according to the invention as well as the program or programs implementing the invention which, once read by the device 10, will be stored on the hard disk 1408. In a variant form, the program enabling the device to implement the invention can be stored in read-only memory 1402 (referred to as ROM in the drawing). In a second variant, the program can be received in order to be stored in an identical fashion to that described previously via the communication network 1413.

The device 10 may be connected to a microphone 1411, in case the data to be processed according to the invention consists of audio signal.

This same device has a screen 1404 for displaying the data to be processed or serving as an interface with the user, who can thus parameterize certain processing modes, using the keyboard 1414 or any other means (a mouse for example).

The central processing unit 1400 (referred to as CPU in the drawing) executes the instructions relating to the implementation of the invention, which are stored in the read only memory 1402 or in the other storage means. On powering up, the processing programs stored in a non-volatile memory, for example the ROM 1402, are transferred into the random access memory RAM 1403, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the detection method.

The communication bus 1401 affords communication between the different elements included in the microcomputer 10 or connected to it. The representation of the bus 1401 is not limiting and, in particular, the central processing unit 1400 is liable to communicate instructions to any element of the microcomputer 10 directly or through another element of the microcomputer 10.

The invention claimed is:

1. A method of temporal segmentation of a video sequence, the method comprising:
   an analysis step, of analyzing one or more markers embedded within the video sequence, wherein content of the one or more markers allows the video sequence to be segmented into a plurality of video sub-sequences.

2. A method according to claim 1, wherein the method further comprises:
   a division step, of dividing the video sequence into a plurality of groups of pictures;
   a selection step, of successively selecting each group of the plurality of groups of pictures;
   an extraction step, of extracting a binary message from each selected group of pictures;

a validity analysis step, of successively analyzing a validity of each binary message extracted in the extraction step, so as to determine whether the extracted binary message is a marker or a sequence of natural noise; and a group step, of grouping together groups of pictures according to a message content thereof.

3. A method according to claim 2, wherein, in the extraction step, a local marker and a global marker are predicted and a first message is extracted from the global marker and a second message is extracted from the local marker.

4. A method according to claim 2, wherein, in the extraction step, a message size is calculated and the binary message is then extracted based on the message size.

5. A method according to claim 2, further comprising a video synchronization step, of performing video synchronization.

6. A method according to claim 2, wherein, in the validity analysis step, a calculation is made of a measure of confidence in a hypothesis that the binary message comes from a group of pictures containing a marker.

7. A method according to claim 2, wherein, in the validity analysis step, a determination is made as to whether a message extracted from a current group of pictures is identical to a message extracted from a preceding group of pictures.

8. A method according to claim 7, wherein, in making the determination, a calculation is made of a percentage (P) of bits that is different between the message extracted from the current group of pictures and the message extracted from the preceding group of pictures, and a decision is made that the message extracted from the current group of pictures and the message extracted from the preceding group of pictures are identical if the percentage (P) is less than a predetermined first value.

9. A method according to claim 7, wherein, in making the determination, a calculation is made of a percentage (P) of bits that is different between the message extracted from the current group of pictures and the message extracted from the preceding group of pictures, and a decision is made that the message extracted from the current group of pictures and the message extracted from the preceding group of pictures are identical if the percentage (P) is less than a predetermined first value and if no temporal de-synchronization is noted or if the percentage (P) is greater than a second predetermined value and if temporal de-synchronization is noted.

10. A method according to claim 2, wherein, in the validity analysis step, a statistic of errors between a reference message and local messages is studied, and a status and a message of a group of pictures initially detected as not comprising any marker is modified, if a percentage of errors between the local messages and the reference message is within a predetermined criterion of the statistic.

11. A method according to claim 10, wherein, in the validity analysis step, an average number of erroneous bits between the reference message and the local messages is calculated.

12. A method according to claim 10 or claim 11, wherein the reference message is calculated from a global group of pictures preceding a local group of pictures for which a change of message has been detected.

13. A method according to claim 11, further comprising:
a comparison step, of comparing the average number of erroneous bits with a binary error rate calculated beforehand; and,
if the average number of erroneous bits is less than a weighted binary error rate by a predetermined value, a status of the corresponding group of pictures is modified so that, if the corresponding group of pictures was considered as not comprising any marker, the corresponding group of pictures will be considered after modification as comprising a marker.

14. A method according to claim 2, wherein, in the validity analysis step, statuses and messages linked to local groups of pictures are improved by a feedback loop.

15. A method according to claim 2, wherein each group of pictures includes 24 consecutive pictures.

16. A digital signal processing apparatus, comprising a device adapted to implement a method according to claim 1.

17. A device for temporal segmentation of a video sequence comprising:
analysis means for analyzing one or more markers embedded within the video sequence, wherein content of the one or more markers allows the video sequence to be segmented into a plurality of video sub-sequences.

18. A device according to claim 17, further comprising:
division means for dividing the video sequence into a plurality of groups of pictures;
selection means for successively selecting each group of the plurality of groups of pictures;
extraction means for extracting a binary message from each selected group of pictures;
validity analysis means for successively analyzing a validity of each binary message extracted by the extraction means, so as to determine whether the extracted binary message is a marker or a sequence of natural noise; and
group means for grouping together groups of pictures according to a message content thereof.

19. A device according to claim 18, wherein the extraction means is adapted to predict a local marker and a global marker and to extract a first message from the global marker and a second message from the local marker.

20. A device according to claim 18, wherein the extraction means is adapted to calculate a message size and then to extract the binary message based on the message size.

21. A device according to claim 18, further comprising video synchronization means for performing video synchronization.

22. A device according to claim 18, wherein the validity analysis means is adapted to calculate a measure of confidence in a hypothesis that the binary message comes from a group of pictures containing a marker.

23. A device according to claim 18, wherein the validity analysis means comprises test means for testing whether a message extracted from a current group of pictures is identical to a message extracted from a preceding group of pictures.

24. A device according to claim 23, wherein the test means is adapted to calculate a percentage (P) of bits that is different between the message extracted from the current group of pictures and the message extracted from the preceding group of pictures and to decide that the message extracted from the current group of pictures and the message extracted from the preceding group of pictures are identical if the percentage (P) is less than a first predetermined value.

25. A device according to claim 23, wherein the test means is adapted to calculate a percentage (P) of bits that is different between the message extracted from the current group of pictures and the message extracted from the preceding group of pictures and to decide that the message extracted from the current group of pictures and the message extracted from the preceding group of pictures are identical if the percentage (P) is less than a first predetermined value and if no temporal de-synchronization is noted or if the percentage (P) is greater than a second predetermined value and if temporal de-synchronization is noted.

26. A device according to claim 18, wherein the validity analysis means comprises studying means for studying a statistic of errors between a reference message and local messages, and modification means for modifying a status and a message of a group of pictures initially detected as not comprising any marker, if a percentage of errors between the local messages and the reference message is within a predetermined criterion of the statistic.

27. A device according to claim 26, wherein the validity analysis means comprises means for calculating an average number of erroneous bits between the reference message and the local messages.

28. A device according to claim 26 or claim 27, wherein the reference message is calculated from a global group of pictures preceding a local group of pictures for which a change of message has been detected.

29. A device according to claim 27, further comprising:
comparison means for comparing the average number of erroneous bits with a binary error rate calculated beforehand; and
modification means for modifying, if the average number of erroneous bits is less than a weighted binary error rate by a predetermined value, a status of a corresponding group of pictures, so that, if the corresponding group of pictures was considered as not comprising any marker, the corresponding group of pictures will be considered after modification as comprising a marker.

30. A device according to claim 18, wherein the validity analysis means implements a feedback loop adapted to improve statuses and messages linked to local groups of pictures.

31. A device according to claim 18, wherein each group of pictures includes 24 consecutive pictures.

32. A digital signal processing apparatus, comprising a device according to claim 17.

* * * * *